United States Patent [19]

Baumoel

[11] Patent Number: 5,117,698
[45] Date of Patent: Jun. 2, 1992

[54] PULSE TRAIN DETECTION IN TRANSIT TIME FLOWMETER

[76] Inventor: Joseph Baumoel, 155 Plant Ave., Hauppauge, N.Y. 11788

[21] Appl. No.: 365,333

[22] Filed: Jun. 13, 1989

Related U.S. Application Data

[63] Continuation-in-part of Ser. No. 281,095, Dec. 7, 1988, abandoned.

[51] Int. Cl.$^5$ ............................................. G06F 1/66
[52] U.S. Cl. ............................................. 73/861.28
[58] Field of Search ....................... 73/861.27, 861.28

[56] References Cited

U.S. PATENT DOCUMENTS

| | | | |
|---|---|---|---|
| 4,098,117 | 7/1978 | Baumoel | 73/861.18 |
| 4,232,548 | 11/1980 | Baumoel | 73/861.28 |
| 4,452,090 | 6/1984 | Kou et al. | 73/861.28 |
| 4,468,971 | 9/1984 | Herzl et al. | 73/861.28 |
| 4,633,719 | 1/1987 | Vander Heyden | 73/861.28 |

*Primary Examiner*—Charles A. Ruehl
*Attorney, Agent, or Firm*—Ostrolenk, Faber, Gerb & Soffen

[57] ABSTRACT

A transit-time flowmeter transmits trains of ultrasonic pulses alternately upstream and downstream through a conduit having liquid flowing therein. Flow speed (fv) is a function of the total liquid travel time ($t_L$) and the difference ($\Delta t$) between the upstream and downstream travel times. The timer $t_L$ is determined by transmitting a short setup pulse train, for example, 1–3 pulses, from one of the transducers. The time the short pulse train is received by the other transducer is taken to define an overall travel time $t_N$. The known pulse travel time within the transducers and pipe walls is subtracted from the time $t_N$, the result being the liquid travel time $t_L$. To measure $\Delta t$, a longer measurement pulse train (Tx), for example 8–100 pulses, is transmitted alternately upstream and downstream. The phase difference is measured between the received (digitized) pulse train $R_D$ and a reference pulse train $f_D$ which is phase-coherent with the transmit signal Tx, and is controlled to be approximately 90° out of phase with the received pulse train $R_D$. Tx and $f_D$ are both derived from a common clock signal fm.

32 Claims, 10 Drawing Sheets

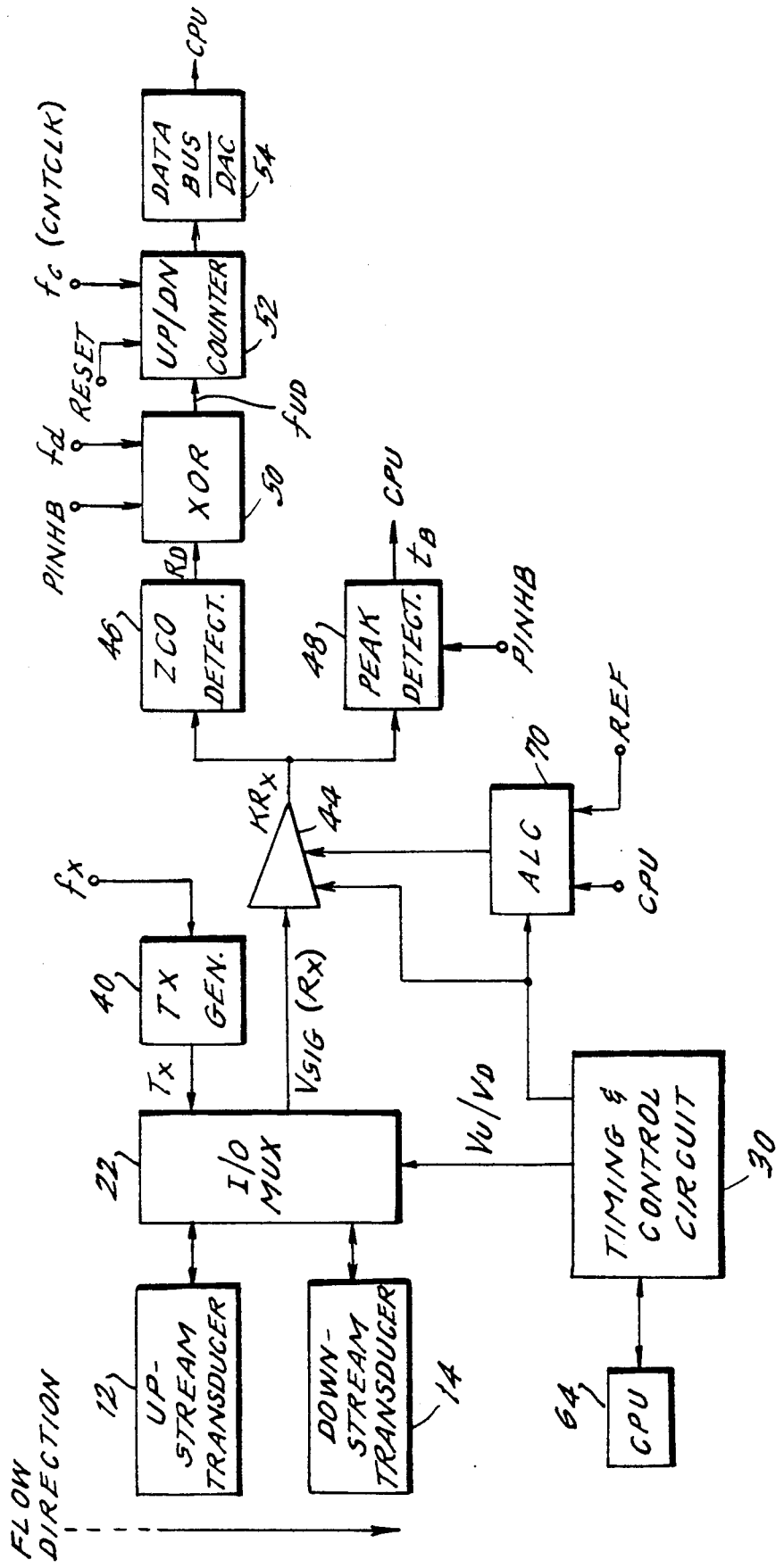

PULSE TRAIN DETECTION IN TRANSIT TIME FLOWMETER

CROSS-REFERENCE TO RELATED APPLICATION

This is a continuation-in-part of Ser. No. 07/281,095, filed Dec. 7, 1988, now abandoned.

II. BACKGROUND OF THE INVENTION

A. Field of the Invention

The invention relates to a precision clamp-on transit-time mass flowmeter. More particularly, it relates to a multi-pulse flowmeter which employs a train of ultrasonic pulses for determining a flow rate. A phase coherency detector is employed for determining the phase and timing of the pulse train received by the receiving transducer An initial setup routine tests a range of ultrasonic frequencies and determines an optimum frequency before flow rate measurements are made.

B. Background Art

Transit-time flowmeters are known, and are the flowmeter of choice for most fluids. See for example, U.S. Pat. Nos. 4,232,548 and 3,869,915. The disclosures of these and all other patents and prior art mentioned herein are expressly incorporated by reference. However, up to the present, transit-time flowmeters have had disadvantages due to their sensitivity to operating conditions as well as the need for close acoustic matching between their transducers and the pipe in which flow is measured.

These flowmeters employ transducers for passing ultrasonic pulses through the wall of a conduit and then receiving the transmitted pulses at a point along the conduit spaced from the transmitting transducer, either on the opposite side of the conduit, or on the same side of the conduit. In the former case, the acoustic energy passes directly through the conduit walls and the flowing liquid, whereas in the latter case, the acoustic energy is reflected by the opposite internal wall of the conduit. Circuitry processes the energy received at the receiving transducer and produces a display of flow rate.

The transducers are clamped to the exterior surface of a pipe and spaced along the pipe axis. They transmit and receive ultrasonic energy through the liquid in either the upstream or the downstream direction. Two measurements are made, namely the difference between the upstream and downstream travel time ($\Delta t$) and the travel time in the liquid ($t_L$). These parameters are measured by circuitry and used to compute the liquid flow rate.

In the system of the '915 patent mentioned above, a first transducer applies a pulse of ultrasonic energy, say in the upstream direction of fluid flow, and the time taken for a given portion of the signal to reach the second transducer is counted by a counter. This counter counts the number of pulses produced by a high frequency clock generator, which runs during this transmission time. The second transducer then sends a pulse of ultrasonic energy in the downstream direction, and the same counter, connected to the same clock generator, counts down until the given point in the return signal is received by the first transducer. The net count remaining in the counter, then, is a function of the difference in time required for the sound energy to go upstream and downstream, which in turn depends on the fluid flow velocity in the pipe.

The '915 patent recognized the problem of ensuring that the time measurement for all up and down cycles is made at the same point in the received signal. It was recognized that, using reasonable clock frequencies, the count difference in a single up-down sequence will be small, and it would be difficult to accurately measure small changes in flow velocity, since a small change in flow velocity might result in little or no change in the number of pulses of the counting clock signalling the processing circuitry.

Hereinafter the term "up cycle" may be used at times to represent the transmission and reception of an ultrasonic pulse in the upstream direction. Correspondingly, a "down cycle" may be employed to denote the generation and reception of a pulse in the downstream direction.

Also, the downstream transducer will be referred to as the "first" transducer and the upstream transducer will be referred to as the "second" transducer. Thus, an up cycle will involve transmission of acoustic energy from the first transducer to the second transducer, whereas a down cycle will involve transmission of acoustic energy from the second transducer to the first transducer.

Accordingly, the '915 patent system employed a relatively large number of upstream measurements, referred to as "up cycles", followed by a correspondingly relatively large number of "down cycles," to form a single count cycle. In this way, it was possible to increase the count difference between the up and down directions in a given count cycle to increase the resolution of measurement. This was useful, but the problem remained of ensuring that the time measurement for all the up and down cycles was made at the same point in the received signal. This problem is complicated, in reality, by the fact that the received signal is complex, containing echoes and other transient effects and varies from instant to instant. However, it was recognized that while the received signal may be complex, the zero-crossover points in the signal remain fairly stable. Accordingly, circuitry was provided to normalize the received signal level, and gate the receiver circuits open when a given instantaneous signal level was reached. Then, the next voltage zero in the return signal was marked as the point at which the time measurement was made.

In the '915 patent, a plurality of up cycles were carried out, followed by a plurality of down cycles, together forming an entire count cycle. Of course, an up cycle, or a plurality of up cycles, ordinarily has a greater length than a down cycle or a plurality of down cycles. A plurality of between 2 and 512 count cycles were carried out in a read cycle (or, preferably, between 128 and 512 count cycles for improved reading accuracy). However, despite the advantages from aggregating many cycles in this way, it is to be noted that the acoustic pulses were each transmitted, detected and measured individually in the '915 patent system.

While the flowmeter of the '915 patent overcame the drawbacks of standard mechanical flowmeters, its accuracy depended on its ability to precisely measure the time interval from the instant an individual ultrasonic pulse is transmitted by the first transducer until the instant it is received by the second transducer. To obtain the desired accuracy, it is important for the received signal, whose wave form is generally a sinusoidal pulse having an exponential envelope, to be detected with reference to the same point within the wave shape, during each upstream-downstream pair of transmissions, or groups of transmissions. In the '915 patent, this was obtained, as discussed above, by detecting a specific zero crossing point within each one of the wave shapes received.

The '548 patent made a further improvement in measurement accuracy. It was recognized that flow readings were affected by systemic noise in the fluid conduit, referred to as "pipe noise". This pipe noise can arise from miscellaneous vibrations from other portions of the equipment, as well as pipe-specific factors such as the ringing of the transmitting transducer, echoes in the pipe, reflections from pipe joints, and so forth. Noise transmitted through the pipe wall from the transmitting transducer to the receiving transducer may not be phase-coherent with the sonic beam transmitted through the liquid, and can combine with the received signal so as to cause a random phase shift of the zero-crossover points of the sonic beam, if the phase of the pipe noise is not the same as that of the received signal. See generally FIGS. 1A–1D and accompanying text in the '548 patent. Other noise may or may not be phase-coherent with the received signal, and may similarly cause phase shifts of the received signal which are more random in nature. A particular problem is that the frequency of the pipe noise transmitted through the pipe wall from the transmitting transducer may be substantially similar to that of the liquid-transmitted ultrasonic pulse, making it nearly impossible to filter such pipe noise out of the received signal. As a result, the zero-crossover points of the received signal are subject to a systemic phase shift which can consistently distort the measurement of both the upstream and downstream transmission times.

In order to overcome the foregoing problem, the '548 patent system measures the upstream and downstream transmission times at each of a plurality of zero-crossover points of the received pulse. Since the probability is low that the phase relationship between the pipe noise and the received signal will be identical at all of the several zero-crossover points, the average effect of the noise for a large number of upstream and downstream transmissions will most likely be reduced.

Note that here again, although the '548 patent may average or combine the measurement results of a number of individual pulse measurements, it still transmits, receives and processes each of the ultrasound pulses on an individual basis.

The System 480 and System 960 transit-time flowmeters manufactured by Controlotron Corp., 155 Plant Avenue, Hauppauge, N.Y. 11788, correspond generally to the '915 and '548 patents, respectively. As just discussed, each of these transmits, receives and processes single or relatively few short pulses from the upstream to the downstream transducer and vice versa and then combines the results of a number of such measurements. Single pulses can be distorted by pipe anomalies and other structural details of the pipe, or by multipath reflections. To avoid this, these commercial systems designate one or more particular points on the received signal curve to determine the upstream-downstream time difference. The measurement is carried out many times and then analyzed statistically, and great accuracy is attained.

Another model, the System 240, optionally transmitted a short train of pulses, but, again, processed them on an individual basis, and was subject to the above mentioned disadvantages. Also known are systems manufactured by Badger Meter, Inc. See U.S. Pat. Nos. 3,935,735 and 4,052,896. These carry out an analog demodulation, and then filter the demodulated product. Such systems do not give excellent performance in the presence of noise.

These systems have employed a variety of transducers. Particularly advantageous is the wide-beam transducer, disclosed and claimed in U.S Pat. No. 3,987,674, which is capable of improving the strength of the received signal and also minimizing signal dispersion. Other transducer structures which may be employed are disclosed in U.S. Pat. Nos. 4,475,054, 4,467,659, 4,425,803 and 4,373,401. The '659 patent system is of particular interest, since it relates to an advantageous metallic transducer housing having a shape which is capable of converting an injected longitudinal sonic energy beam from a transducer crystal into a shear mode beam by internal reflection from a surface of the housing.

U.S. Pat. No. 4,333,353 is also of interest and is incorporated by reference herein, although it is a Doppler flowmeter rather than a transit-time flowmeter, for its recognition of the problems of transmitting energy from the exterior to the interior of a conduit, due to phase cancellation of the transmit signal due to internal pipe wall reflections. Also of interest are the means proposed in the '353 patent for solving these problems.

III. SUMMARY OF THE INVENTION

Because of the foregoing problems, further increases in sensitivity are needed. In particular, it is desirable for the system to be made more noise-resistant. It is also desirable to make it possible to amplify the received system, even without filtering out the noise, and then achieve an accurate measurement result despite the presence of such amplified noise. It is also important to reject any initial transient effects or other physical factors which may distort the received signal.

These and other objects are accomplished by the present invention, which transmits not one pulse or a short pulse train of pulses, but rather employs a pulse train of a substantial length (Tx) for measuring flow rate.

Initially, a short pulse train is transmitted and the total transit time between transmit and receive ($t_N$) is measured. The transit time in liquid ($t_L$) is taken to be $t_N$, less the known length of time the acoustic signals remain in the transducers and the pipe walls $t_F$. Then, to measure flow rate, the disclosed embodiment transmits a pulse train of substantial length (N) and detects a received pulse train (Rx) whose central portion (following initial transient effects) has the same frequency as the transmitted pulse train. Then it is only necessary to detect the portion of the received signal which is phase coherent with the transmit signal, and measure the phase difference between the transmitted and received signals, to determine the upstream-downstream time difference ($\Delta t$), and thereby the flow rate.

Thus, the time difference $\Delta t$ is calculated as a function of such phase difference, according to the formula:

$$f = k \frac{\Delta t}{t_L} \tag{1}$$

The length N of the pulse train is selected to be the maximum Δt that is permitted without causing overflow of the Δt register of the particular embodiment.

An initial setup routine tests a range of ultrasonic frequencies and determines an optimum frequency before flow rate measurements are made.

IV. BRIEF DESCRIPTION OF THE DRAWINGS

These and other objects, features and advantages of the invention will be understood from the following detailed description of an embodiment thereof, with reference to the drawings, in which:

FIG. 2 is a schematic block diagram of a phase detection circuit according to an embodiment of the invention;

V. DETAILED DESCRIPTION OF AN ILLUSTRATIVE EMBODIMENT

A. General Description

Figure 1:
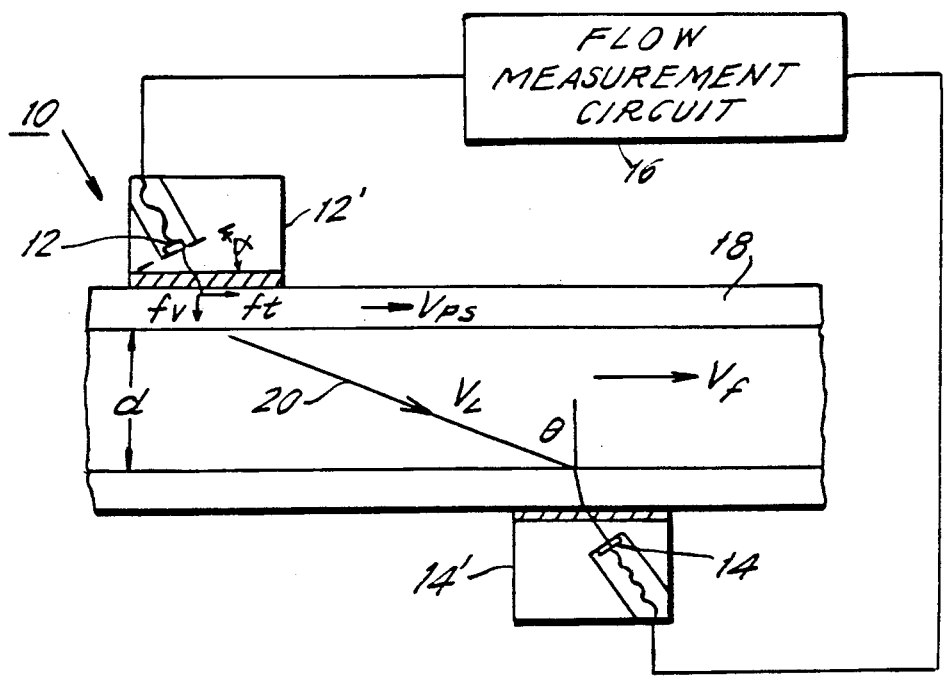
FIG. 1 is a schematic illustration of a transit-time flowmeter associated with a conduit.

Referring first to FIG. 1, there is seen a liquid flow meter arrangement constructed in accordance with the principles of the present invention and designated generally as 10. This invention is also embodied in the System 990 flow meter which is manufactured by and available from Controlotron Corp.

Liquid flow meter 10 includes a pair of transducers 12 and 14 and a flow measurement circuit 16. Transducers 12 and 14 are coupled to the outer wall of pipe 18 by transducer housings 12', 14', respectively, and are selectively energized by the flow measurement circuit, as described hereinbelow, so as to transmit trains of ultrasonic pulses in the upstream and downstream directions between first transducer 12 and second transducer 14.

The transducer structure disclosed in FIG. 1 is the same as that disclosed in the above-mentioned '548 and '674 patents, although other transducer structures may be employed with the flow measurement circuit according to the present invention.

The present invention is equally applicable to a reflected-beam system, for example that disclosed in U.S. Pat. No. 3,869,915.

In addition to selectively energizing the transducers 12, 14, the flow measurement circuit 16 measures the difference in the travel time of the upstream and downstream pulses between the transducers, hereinafter referred to as Δt; the total travel time between the transducers, hereinafter $t_N$; and as a function of these parameters, calculates the transit time in liquid $t_L$; and then computes the flow velocity $V_f$ of the liquid in the pipe 18, according to the above-mentioned equation (1). K is a constant which is determined by various pipe and fluid parameters according to the principles disclosed in the above-referenced U.S. patents, and known to the prior art generally.

As will be shown below, the flow measurement circuit 16 includes apparatus for measuring both Δt and $t_L$ and for dividing these values to arrive at the flow rate $V_f$.

It will be noted in the following that the circuitry according to this invention can be applied as the signal recognition circuit 24 in the U.S. Pat. No. 4,232,548. However, its principles have broader applications as well.

The disclosed embodiment carries out the following operations, which will be described below:

1. Transmit and receive cycles
   a. U/D Mux
   b. $F_x$ generation
   c. Pulse train generation
   d. ALC
   e. PINHB
   f. Tba
   g. Demodulation
   h. Reframing
2. Data extraction
   a. $t_L$ determination
   b. Reframing accountability The basic flow rate detection principle in this invention, as in many of the above-mentioned prior art systems, is that flow rate is detected by its effect on the transit time of sonic energy in the upstream path versus the downstream path. However, an important feature of the present system is that a defined pulse train of sonic energy, namely a pulse train having a defined length, is transmitted, rather than a single short pulse or a short group of pulses. By these means, and by means of a system of transmit frequency control to avoid transmit signal cancellation in the pipe wall, the system permits a predetermined set of standard transducers to be used, for any pipe wall thickness and pipe material, and does not require custom transducers to give a close match between the transducer characteristics and the pipe parameters.

The system determines the basic data, namely Δt and $t_L$, at regular intervals of, say, 100 microseconds to several milliseconds depending on pipe size, and then computes the flow velocity and/or volumetric flow rate and outputs such data. However, it is important for the system to wait, before beginning these calculations, for the decline of initial transient effects such as pipe echoes, which if present can cause data scatter and drift.

Flow velocity is computed from the equation:

$$vf = Kr*Kd*Vt*(Vpso/Vps)*dt/TL$$

where:
- vf = Flow velocity in ft/sec
- Kr = Flow Profile Compensation, a number less than 1
- Kd = Transducer Dispersion Compensation, a number approximately 1
- Vt = Phase velocity of transducer in ft/sec
- Vpso = Shear mode velocity of design nominal pipe in ft/sec
- Vps = Shear mode velocity of actual pipe
- dt = up vs. down transit time difference in seconds
- TL = Liquid transit time (average up and down) in seconds It is desirable for there to be CPU registers that hold the last "N" Vf measurements, where the factor N is controlled by the user's decision on system damping. The output value of Vf will be the average of the N individual vf measurements, in which there may be a predetermined weighting of the earlier vf data vs. later vf data according to a weighting algorithm.

Once Vf has been obtained, the volumetric flow rate can be computed from the following relationship:

$$Fv = Vf * Kc * A$$

where
- Fv = Volumetric flow rate in user preferred units
- Vf = Flow velocity in ft/sec
- Kc = Conversion factor of velocity to user's preferred units
- A = Pipe cross sectional area in units of user's preference Now it is often desired to obtain flow total. The system used for calculation of total flow may be that used in U.S. Patent 4,232,548, with the same choice of ranging and units offered there. In general, total flow is computed from the following formula:

$$T = Fv * t * Kt$$

where
- T = Flow total in user preferred units
- t = Elapsed time since last clearance of total register
- Kt = Conversion factor from user preferred rate to total units A lookup table is desirably employed to develop the desired outputs based on $\Delta t$ and $t_L$.

B. Operation

In accordance with the foregoing, the operation of the system may be summarized as follows:

1. Timing

Figure 3:
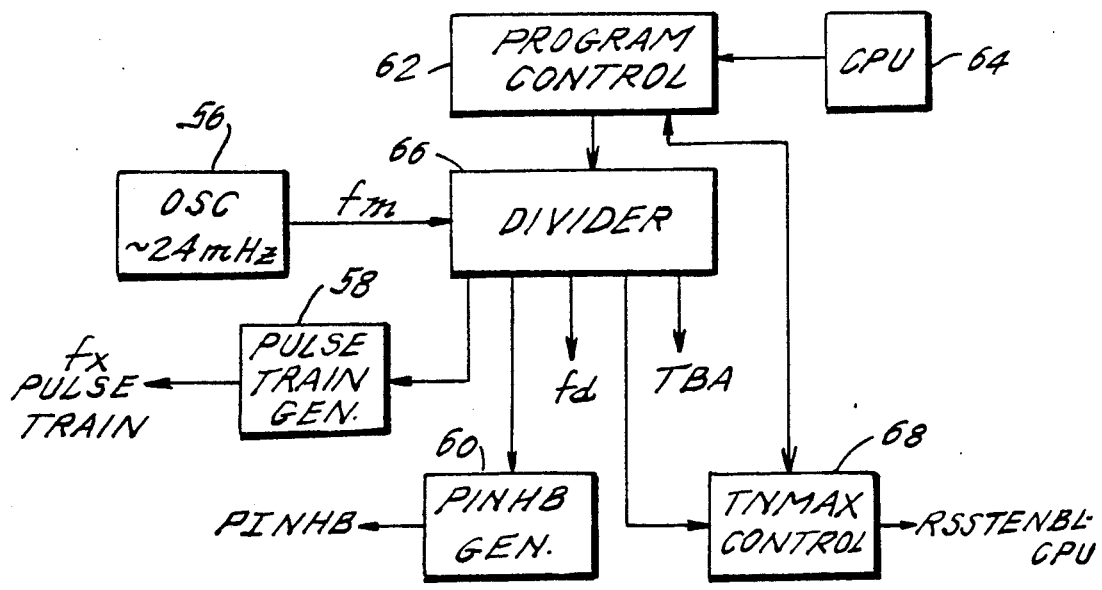
FIG. 3 is a schematic block diagram of a frequency synthesizer circuit for use with the circuit of FIG. 2.

FIG. 3 illustrates the synthesizer module 30a, which supplies the signals referenced in FIG. 2. An oscillator 56 (FIG. 3) running at approximately 24 MHz is a source of various signals obtained by division in a divider 66 which include fx, PINHB, Tba, and TN max. The value of fx can vary from, e.g., about 60 KHz to about 12 MHz, depending on the pipe material, the particular wall thickness in the pipe and the particular transducers. It is desirable for the pipe wall reflections to arrive in phase with the incoming liquid wavefronts to the transducer.

The CPU 64 (FIGS. 2 and 3) issues a Transmit command. The pulse train generator 58 then delivers a predetermined number (N), of pulses of frequency fx to the Tx generator 40 for distribution to the Up or Dn transducer 12, 14 as determined by the U/D Mux 22. N and fx are determined by the CPU in accordance with the pipe diameter and the transducer being used.

Just prior to the start of the transmit pulse train, a signal PINHB is initiated (goes low), to preclude generation of flow measurement data and particularly to preclude generation of receive signal Rx level peak detection by the peak detector 48, prior to the time at which it is actually possible for receive signals Rx to arrive via a path through the particular liquid and in a pipe of that particular size. In addition a second delay period, Tba, is initiated, starting at the actual start of the pulse train, at the end of which time, phase detection of the receive signal will be permitted.

$T_N$ and Tba will be determined by a special "short pulse train" transmit cycle comprising, e.g., 3 pulse cycles, which will be generated at certain intervals, say once in 10 data cycles or as may be required. Thus, $t_N$ (and thereby $t_L$), is determined at the beginning of a measurement process and is only determined once for multiple measurements of $\Delta t$. It is only recommended if necessary, e.g., if the pipe goes empty, or the liquid is changed to a different liquid giving a different $t_N$ value.

The Tba generation will be very similar to generation of Tba in U.S. Pat. No. 4,232,548. The short duration receive signal which results from the short pulse train will be subject to its own ALC control. The resultant Tb pulses (only one Tb pulse being shown in FIG. 4) will be used both for gain control and for the generation of a Tbt marker to which the Tba signal will be servoed by an "early/late" detector See U.S. Pat. No. 4,323,548. Thus the resultant Tba will very precisely locate the arrival time of the beginning of the pulse train which will be received during normal data cycles, and afterwards this arrival time will be located by reframing accountability (discussed below).

The receive Mux 22 (FIG. 2) will direct the receive (Rx) signal to a gain controllable amplifier 44 whose output KRx is fed to a peak detector 48 comprising Tbtp and Tbtn detectors (positive and negative reference level comparators, respectively) and to a synchronous demodulator circuit 46, 50. The Tb peak detector 48 advises the CPU if either the positive or negative rf pulse train signal peak is equal to or greater than a given reference level which is chosen to assure linear operation of the phase demodulator. This operation takes place during the data measurement cycles, and not in the Tba cycle.

In other words there are two different ALC-controlled amplifier 44 gain conditions, one for the flow measurement pulse train and one for the Tb or "short pulse train" transmit cycle. The CPU will have commanded each condition and will therefore be capable of commanding the correct gain.

During the pulse train cycles, an Rx window (FIG. 4, line G) will be generated a predetermined number of fx periods after Tba. The Rx window will have a duration of a specific number of fx periods such that it will encompass the "heart" of the receive signal pulse train Rx (FIG. 4, line B) In other words, the length of the Rx window will be slightly less than the length "N" of the transmit pulse train. During the Rx window, the up-down counter 52 connected to the output of the demodulator 50 will be enabled to integrate the demodulated receive signal.

The integrated output will have an amplitude that is dependent on the relative phase of the received signal pulse train Rx and the demodulator 50 clock input fd. This clock input is at the same frequency as the pulse trains Tx and Rx, i.e., at the frequency fx. Fd is controlled to be approximately in quadrature with $R_D$. Thus, assuming the phase of the clock were 90 degrees out of phase with Vsig (Rx), the integrator output would be exactly zero.

The capacity of the integrator 52 is set so as to produce an output somewhat less than its saturation value when the phase of Vsig (Rx) and CLK are displaced by exactly one unit of resolution of the phase control of the CLK, then the value of the output of the integrator at the end of the Rx integration cycle can be identified as a fraction of the CLK phasing resolution. In other words the digitized integrator "residue" output is immediately interpretable as a "Vernier" of relative delay between the $f_D$ and Vsig (Rx). Furthermore, a value of the digitized integrator output greater than the value associated with one unit of phasing resolution can be used as a command to change the CLK phasing by one unit of resolution, a process which can be repeated until the residue represents a value less than one unit of framing, which is equal to one period of the approximately 24 MHz oscillator.

It should be noted that the action of the integrator is to make each cycle of fx in the Rx window contribute to the residue. In other words, there is excellent averaging of the phase data corresponding to each received pulse across the entire Rx period. This produces great data sensitivity and zero stability as compared to any system which derives only a single ZCO during a given transmission cycle, since pipe noise is averaged over the entire length of the received signal duration. In addition, this system is much less influenced by the shift of the Rx window by one fx period as compared to a disadvantageous zero shift produced by the prior art systems including U.S. Pat. No. 4,232,548 under the same conditions.

Since the process pulse train described is repeated separately for both up and down transmissions, the CLK phasing and Integrator residue for each direction can be "subtracted" so as to obtain a value for $\Delta t$. It is also necessary to obtain a value for TL so as to compute the flow. Note that the Tba value obtained previously for locating the Rx window is actually a very good measure of $t_N$, the total time from transmit to receive, from which it is very simple to derive TL. Since the phasing of CLK for demodulation of Vsig has already been accomplished prior to Vsig arrival (in fact it must be done before the end of PINHB), it is clear that Tba is known to the resolution of the main clock. In any event, though TL is dependent on the location of the Vsig peak during the short pulse train transmission, a combination of dither and the natural effects of slow Tba averaging will serve to stabilize TL, and further averaging or slew rate control can be performed, for further data stabilization.

Thus what has been described is a complete system for accurate and simple determination of both $\Delta t$ and TL, all the factors that are needed for accurate and stable determination of flow rate.

2. Detection Module

The Detection module (referring to FIG. 2) includes the following circuits:
*Master Clock 56
*programmable Divider 66 Generating:
  *fx
  *PINHB
  *Tba
  *Rx Window
  *TN max
  *fd
*phase Demodulator 46, 50 and Integrator 52
*Up/Dn Control Gate Generator 22, 30

On command from the System Computer 64, the U/D multiplexing gate 22 assumes one or the other condition. The pulse train generator 58 receives a command to generate an fx frequency. A command to issue a pulse train of frequency fx of a designated number of pulses is received, which pulse train is output to the Tx Generator 40.

Simultaneous with the start of the transmit pulse train, or later (but in time to be effective), the programmed divider 66 is conditioned to count out the passage of time to the following events:
*PINHB
*Rx window
*Tba
*TN max PINHB has the same meaning as this term had in U.S. Pat. No. 4,232,548. It represents a time after the beginning of transmit during which any Tb must be due to noise, since this time is earlier than the earliest actual receive signal could arrive, as computed on the basis of the pipe diameter, fastest liquid sonic velocity, transducer spacing and type of transducer being used. This time is computed by the CPU from these data and imposed on the programmable divider so as to cause the Tb gate to open for the recognition of Tb after the completion of PINHB. Thus, after the end of PINHB, the system can recognize the Tb which will occur each time the maximum peak of the receive rf signal exceeds the ALC reference level.

Different size pipes result in different times during which the receive signal should have arrived, even for the slowest liquid sonic velocity. This time may be computed by the CPU from the same type of information which permitted computation of PINHB. This time may also be counted out by the programmable divider 66. Thus, if no demodulated receive signal is detected before the end of TN max, the CPU causes a TN max control 68 to issue a restart signal, while issuing a warning or alarm as to a possible system failure.

3. Input Module

The Input module is very similar in operation to the related functions carried out by the Input module of U.S. Pat. No. 4,232,548. It is equipped with a single (or optionally dual or multiple) channel Up/Dn Multiplexer 22 which can be conditioned by the CPU 64 to function as a single channel, as two entirely separate channels, or as the two inputs to a dual path system. These paths may be either direct or reflected.

The Input module contains the following circuits:
*At least one UP/DN Multiplexer 22
*A Transmit Generator 40
*A Receive Signal Amplifier 44
*An Automatic Level Control Circuit 70 for the Amplifier 44
*A Linear Synchronous Demodulator 46, 50
*RF Signal Peak Detectors (Tbtn and Tbtp) in a peak detector 48
*A Tba Early/Late Detector (see the '548 patent, cols. 6-8)

The Tx (transmit) Generator 40 converts the fx pulse train received from the pulse train generator 58 to a form suitable for driving the line impedance matched Transducers 12, 14.

The UP/DN Multiplexer 22 alternately passes the transmit signal to the upstream or downstream transducer, or passes its receive signal to the Signal Amplifier 44.

The Amplifier 44 has a fixed bandwidth capable of accommodating any of the transducer frequencies contemplated to handle the range of pipe diameters for which this system is planned. Its gain is automatically adjusted by an ALC circuit 70 under CPU control to produce an output amplitude suitable for linear operation of the Demodulator 46, 50.

The Tbn and Tbp comparators in peak detector are inhibited by PINHB so that Tbtn and Tbtp are assured of representing the actual liquid path receive input signal, unless the signal to noise ratio falls below acceptable limits. The occurrence of a Tbtp or Tbtn is reported to the CPU 64 which uses this information to control ALC circuit 44.

Figure 4:
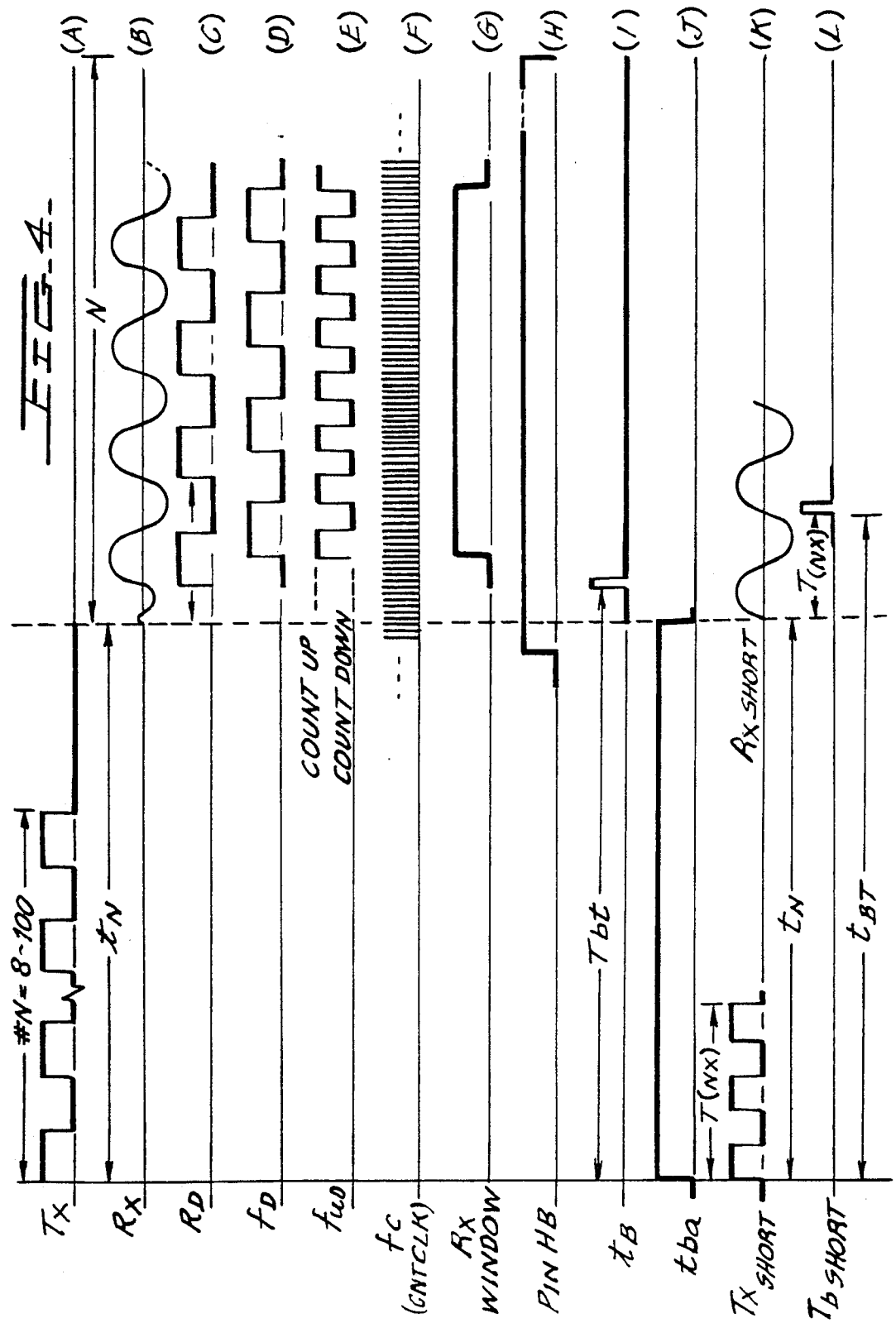
FIG. 4 is a timing diagram for use in explaining the disclosed embodiment of the invention.

In accordance with the foregoing, $R_D$ in FIG. 4, line C represents the output of the ZCO detector 46, that is, the digitized received signal. The synthesizer module 30a provides a signal $f_d$ (FIG. 4, line D), which is timed by the CPU so as to maintain a phase relationship of about 90° with the signal $R_D$. The demodulating XOR gate 50 combines the signals $R_D$ and $f_d$ and outputs a signal $f_{UD}$ having a duty cycle of about 50%, as shown in FIG. 4, line E.

$F_D$ is phase-coherent with $R_D$, but is delayed (or advanced) to the extent that the pulse transit time is increased (or reduced) by the liquid flow in the pipe. Since $f_{UD}$ is the result of XORing $R_D$ and $f_D$, it follows that the duty cycle of $f_{UD}$ is a function of the changing phase relationship between $R_D$ and $f_D$, and thus directly reflects both the transit time $t_L$ and the up-down time difference $\Delta t$.

The duty cycle of $f_{UD}$ is measured by using $f_{UD}$ to control the counting direction (up or down) of a counter 52, which counts the pulses of a clock signal $f_c$ (CNTCLK). When $f_{UD}$ is high the counter 52 counts up, and when $f_{UD}$ is low it counts down. As a result the count residue in the counter 52 is a function of the duty cycle of $f_{UD}$, and accordingly, can be directly converted into $\Delta t$.

On the other hand, $t_L$ is detected and output by the peak detector 48, as described above.

The duty cycle of signal $f_{UD}$ is kept at preferably at about 50% for reasons of accuracy, that is, so an appreciable member of pulses of $f_C$ may be counted in both the up cycles and the down cycles, and also to avoid the risk that a flow change will cause an edge of the $F_D$ signal actually to reach an edge of the $R_D$ signal. This duty cycle will of course vary somewhat from 50% since $\Delta t$ is not zero. It may be allowed to vary from 50% by any selected acceptable amount. If the $f_{UD}$ duty cycle becomes unacceptably either high or low, then the CPU reframes the $R_x$ window by inserting or removing a number of framing pulses of the master clock $f_M$ which precede the generation of $f_d$ by the divider 66.

The count clock signal $f_C$ is generated by a different synthesizer than is the master clock signal $f_M$. These two clock signals desirably have a special relationship. To avoid undesirable moire effects, $F_c$ and $F_m$ preferably do not have a harmonic or pseudo-harmonic relationship. Properly choosing the ratio between $F_c$ and $F_m$ will result in very small data scatter In the present embodiment, $F_m \approx 0.65 F_c$, $F_m$ being for example about 24 MHz. Preferably, the ratio should be a non-repeating or infrequently repeating decimal value. For example, 0.65 has proved satisfactory. Note that $1/0.65 = 1.538461538461 \ldots$; i.e., there is a repeating block of six decimal digits. A ratio with more frequent repetition would be less satisfactory. This particular relationship between $F_m$ and $F_c$ is not required, but it is highly advantageous for improving stability, as described just above.

4. Operating System Routine Description

Figure 6:
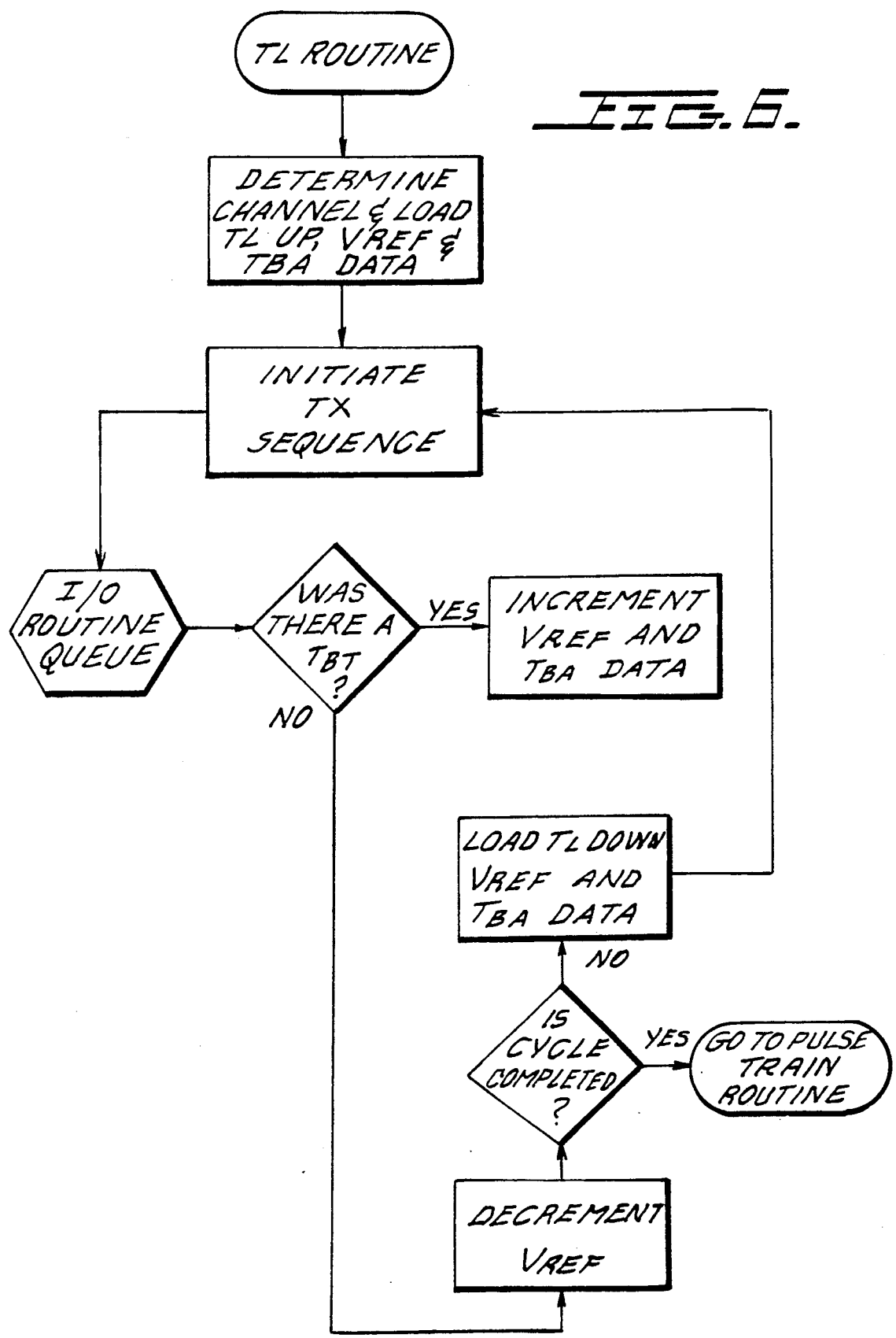
Figure 7:
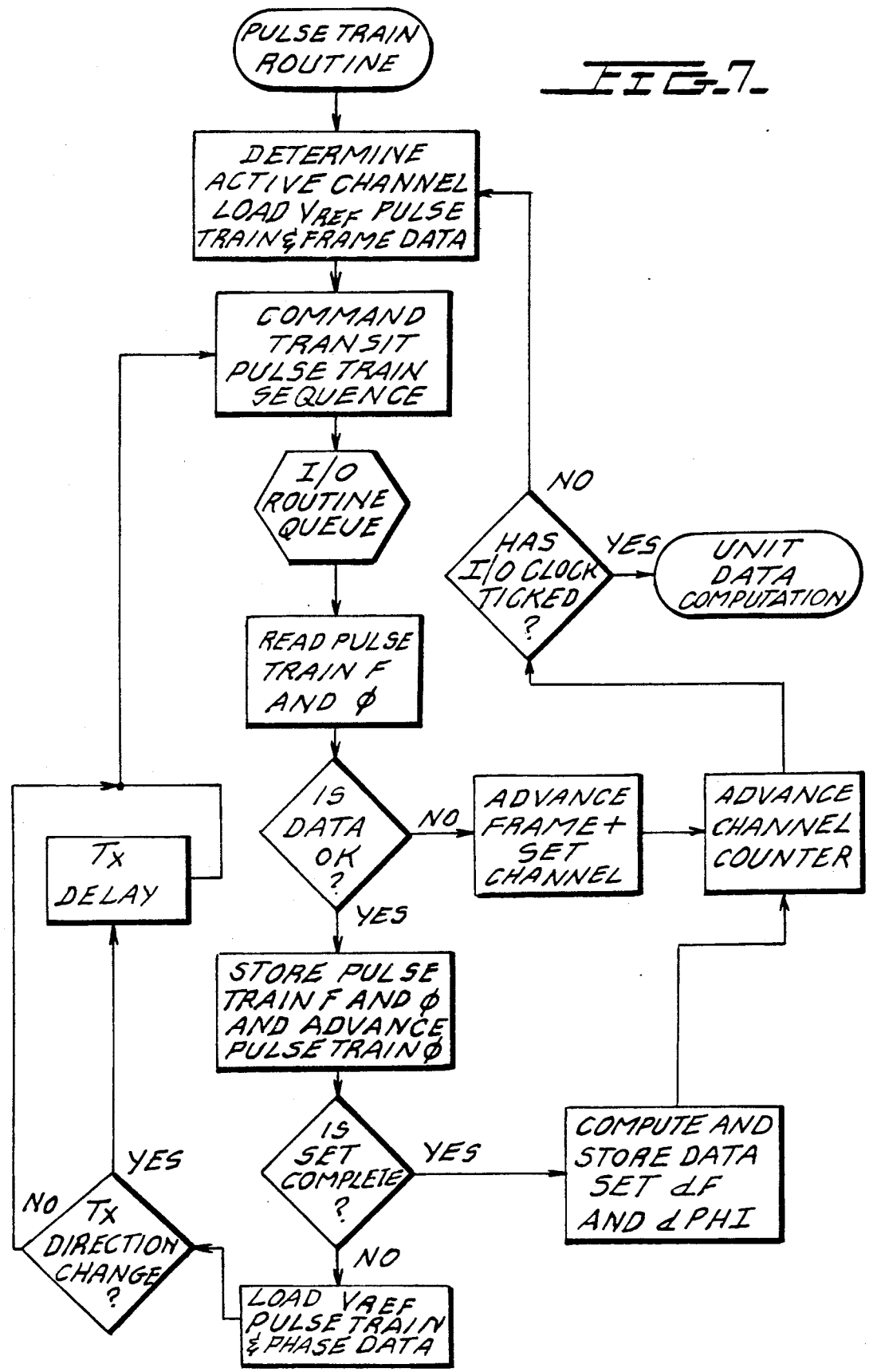
Figure 8:
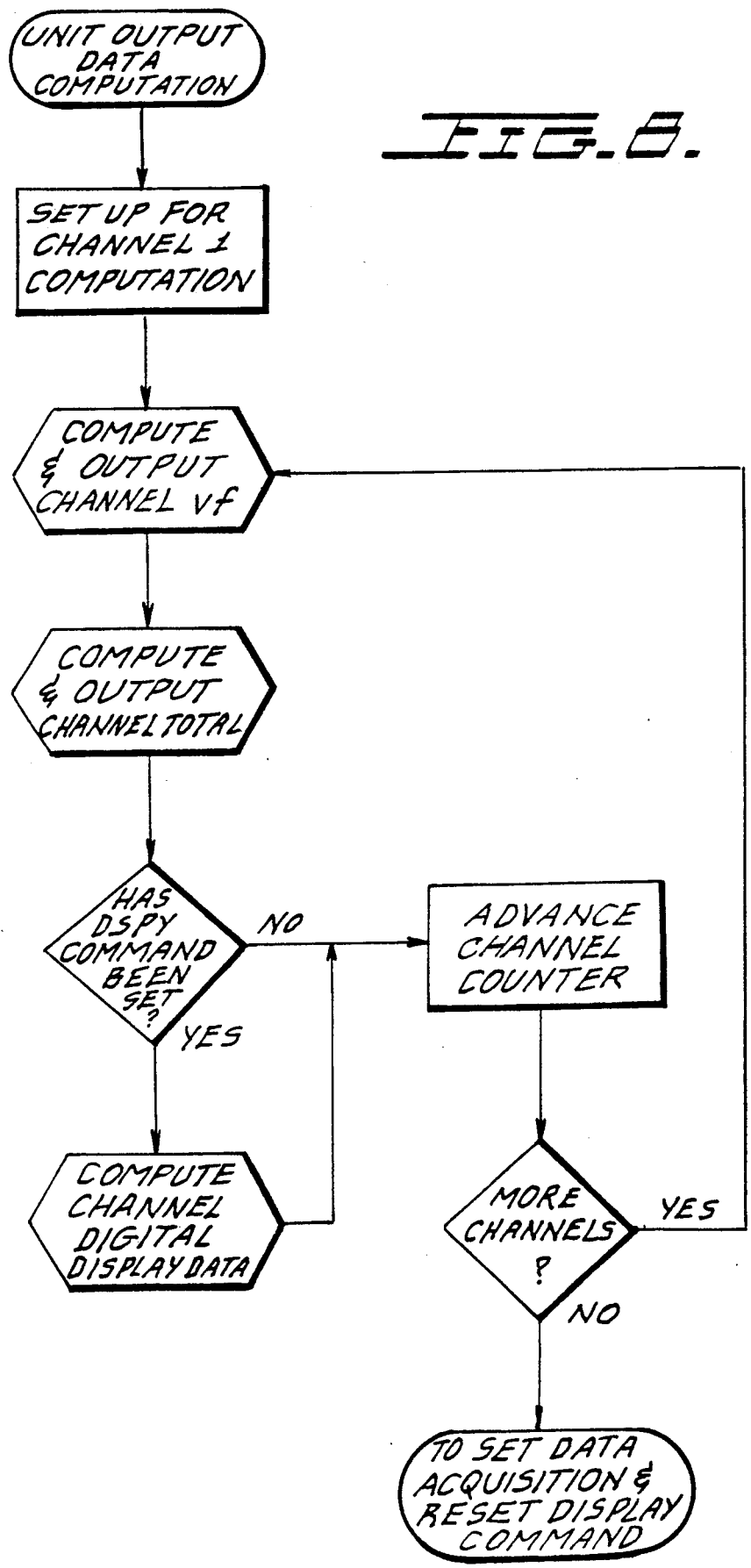
Figure 9:
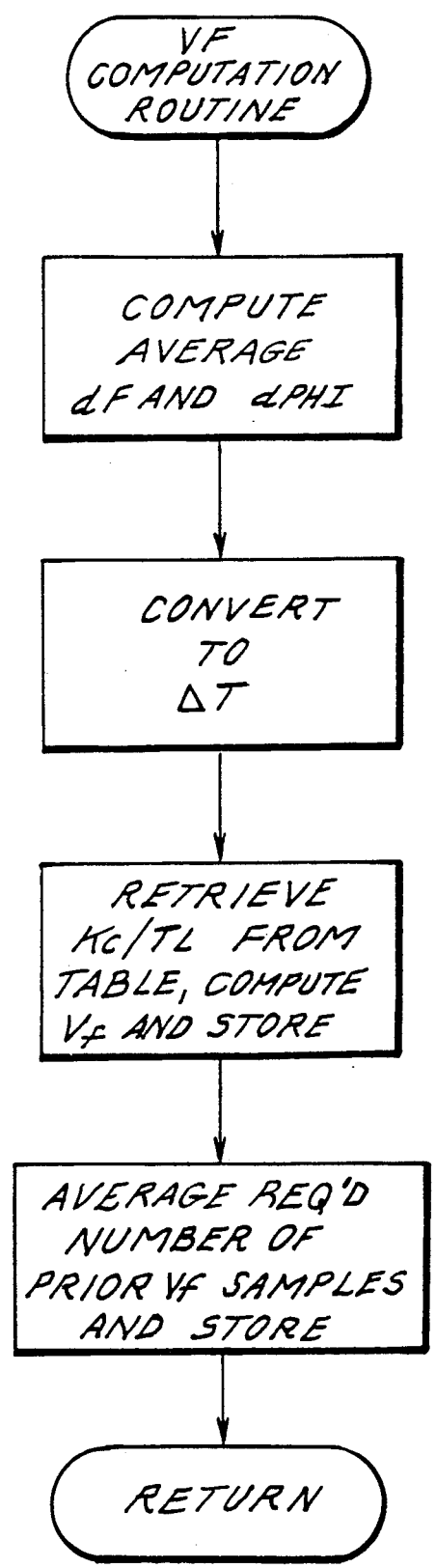
Figure 11:
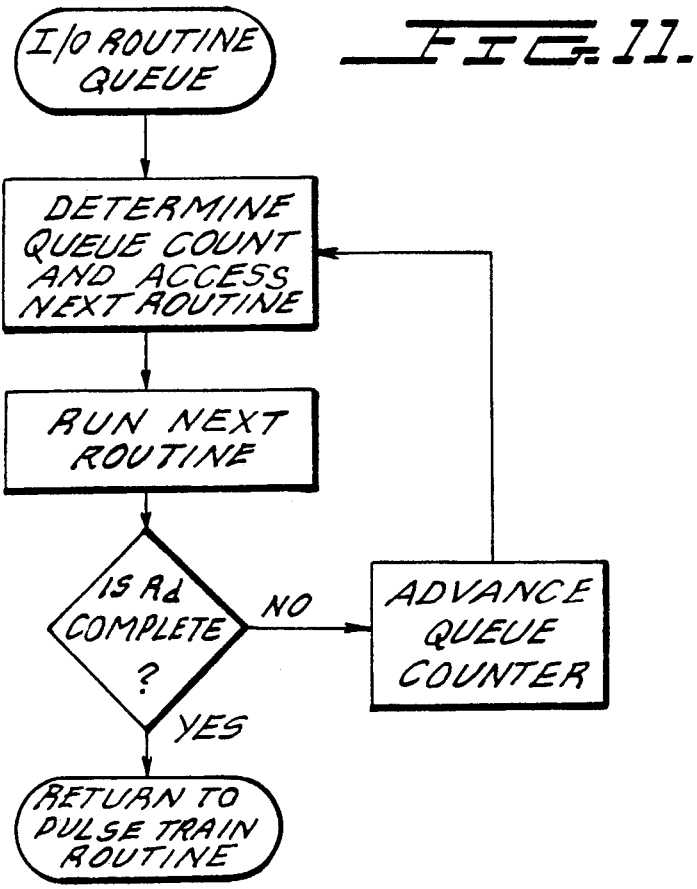
Figure 12:
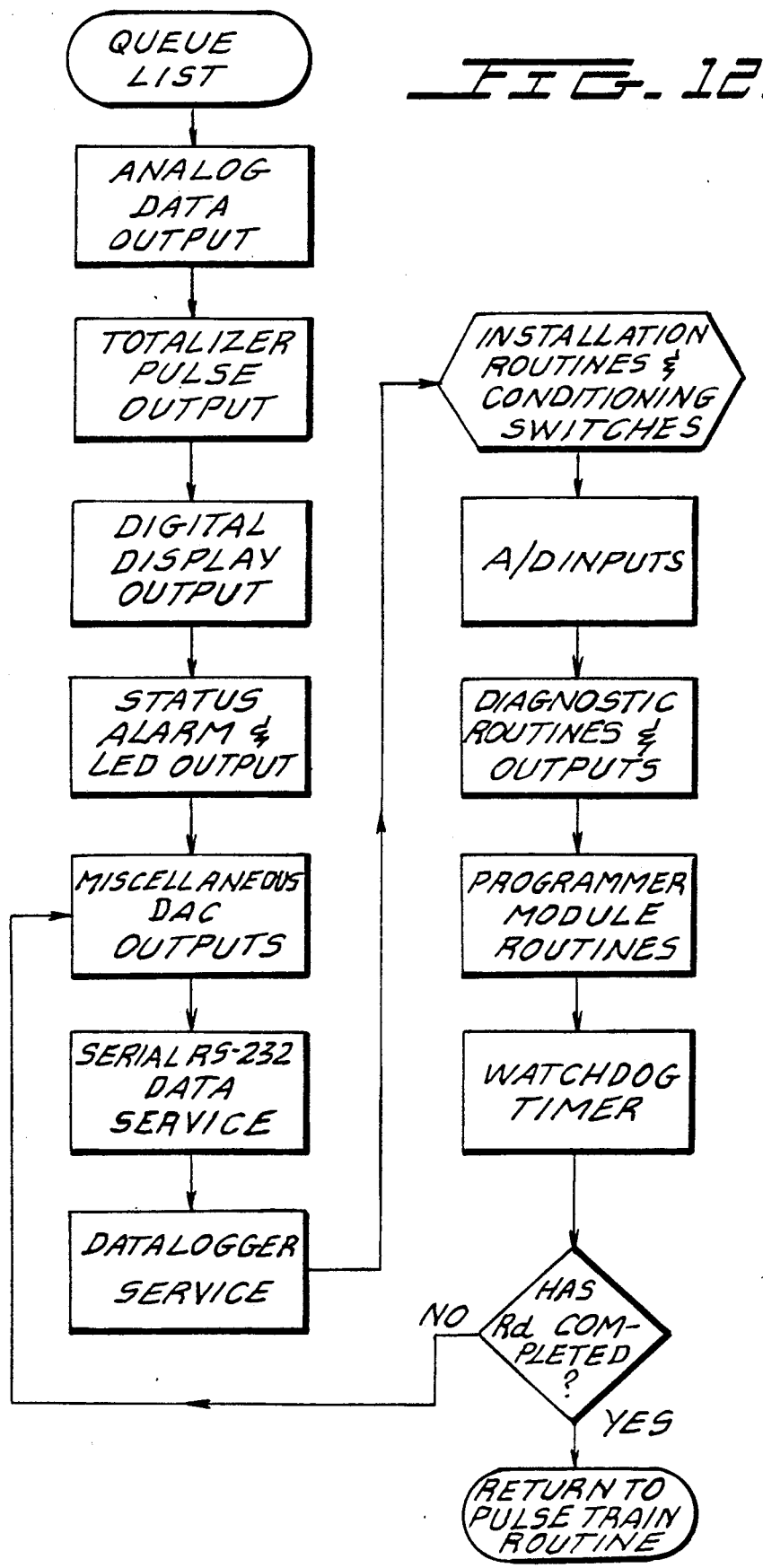

The following routines are described in this section:
4.1 Data Set Acquisition (FIG. 5)
  4.1.1 TL Routine (FIG. 6)
  4.1.2 Pulse Train Routine (FIG. 7)
4.2 Unit Data Computation (FIG. 8)
  4.2.1 Compute Channel vf (FIG. 9)
4.3 Data I/O Routine (FIG. 10) and I/O Routine Queue (FIG. 11)
  4.3.1 I/O Queue List (FIG. 12)

4.1 Data Set Acquisition

The term "Data Set Acquisition" refers to the process of obtaining the basic unit of flow data from the elemental "up/dn-dn/up" transmit data set. It is, if required, necessary to precede obtaining the flow data by updating "TL" measurement if certain flags indicate that the current value of TL may be correct.

Figure 5:
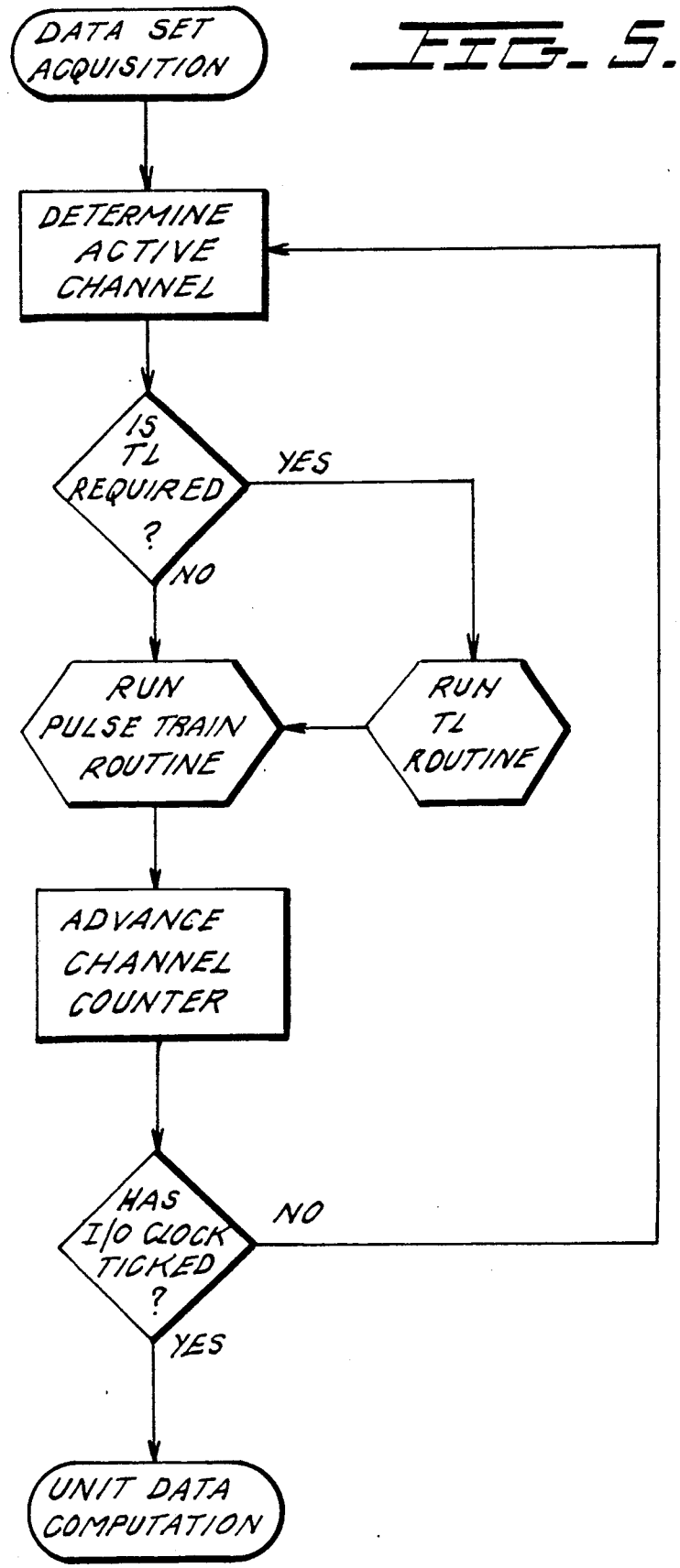
FIGS. 5-12 are flow charts depicting operating routines of the flowmeter.

The Data Set Acquisition is shown on a flow chart in FIG. 5. This routine begins with determination of the number of the current channel, if the machine is a multichannel model. Then a flag is read to determine if a TL update is required for that channel at that particular time. Setting of the flag is controlled by a separate routine which assures that TL properly reflects the actual liquid TL value even if VS is changing at the maximum rate permitted by the particular system specifications. The TL routine flow chart is described below, in para 4.1.1.

Then the actual flow data is obtained. This is accomplished in the "Pulse Train Routine", described below, in conjunction with a flow chart in FIG. 7. After completion of the pulse train routine, the program advances the channel counter, if the machine is multichannel, so as to ready the system for the next data set acquisition. It then checks to see if the 0.1 second I/O clock has "ticked". If not, the system immediately proceeds to the next Data Set Acquisition. If it has ticked, the system momentarily stops data acquisition and proceeds to the "Unit Data Computation" routine, shown on FIG. 8, where the delta T data accumulated during the pulse train routines run in the prior 0.1 second will be converted into actual flow velocity for each active channel.

4.1.1 TL Routine

It has been determined that the usual pulse train receive signal does not have a sufficiently distinctive peak to accurately define TL. Therefore it is important to determine where the beginning of the pulse train is by use of digital processing. In brief, here is how this can be done:

During initial setup, when the system is first turned on, the system produces short pulse trains of transmit, preferably 1, but up to 3 pulses of the designated frequency. ALC is applied to the resultant receive signal. When ALC is applied, the Tb pulses that periodically occur are used to locate Tba (Tb average), by employing the "early/late" servo, as in the '548 patent. Tba is then embodied as a number in a register.

When this is done we are ready to start the process of finding TN, needed to determine the value of TL, a component of the equation:

$$F = k*(delta\ t)/TL$$

The preferred way of determining TN is as in U.S. Pat. No. 4,232,548, in which it is assumed that TN is a "given" number of fx periods prior to Tba. In the case given here, the "given" number would be increased by one fx period for each Tba transmit pulse greater than one. Measurement of this relationship for actual transducers and pipes should give very reliable figures for this factor A lookup table may contain the library values for TE, the offset timing between Tba and TN.

Once acquired, the system can keep track of any change in TN by adding or subtracting the reframing counts that will occur during the normal pulse train routine as flow or Vs (liquid sonic velocity) changes, unless the change caused by these factors is sudden and great, and also coincidentally such as to produce the same phase number as before the change, precluding a command to reframe, the usual signal that danger of losing TN exists. However, separate checks exist, such as continuously checking that the Tb that occurs during normal data acquisition occurs during the expected period of the receive pulse train. In addition, other conditions, such as empty pipe, sudden excessive delta t, or loss and turn on of power, automatically command a new setup or "makeup" routine so as to assure that we have the correct value of TN in the register for computation of flow rate.

Once the actual time of arrival of the receive pulse train has been established, in either the up or down transmit direction, or in both if desired, it can be corrected for the small effect of flow on the perceived TN. The resultant of this process is preferably used as the pointer in a TL Lookup Table, as previously described Note that the search described above can be implemented in "reverse", starting at the measured Tb time and moving the demodulation window backward, searching for count instability.

4.1.1(a) Avoiding "Dogbone" Shape Vsig Distortion Errors

It should also be recognized that the ability to obtain count stability is dependent on the actual receive signal being coherent for a time period at least as long as the transmit/demodulation pulse train length. If the receive signal is subject to destructive interference, the shape of the receive signal may take on a "dogbone" or dumbbell shape, with periods of little or no signal return. In such a case there will be count instability even when the demodulation window coincides exactly with the position of the receive signal. In such a case it may be necessary to decrease the length of the demodulation window, or take other corrective action to avoid gross error in flow detection.

Two basic approaches exist for detection of the dogbone effect:

1) Compute the dogbone shape by recognition that it is caused by reflections in the pipe wall under the transmit transducer, and can be computed from knowledge of the behavior of these reflections. This method will be dependent on the actual sonic velocity of the pipe.

This method has the advantage (when reliable) that it would advise the correct transducer installation and fx prior to transducer installation, saving some difficulty in this operation.

2) The existence of the dogbone shape can be detected by actual measurement of the Vsig amplitude over the entire active receive window region, using the VALC as the measure of amplitude, as determined by a narrow PINHB NOT search window. This method would take some time to perform, but would only have to be done once for each installation.

However, it has the advantage that it is accurate, and does not have the uncertainty associated with the computation method.

Once determined that a dogbone does exist, the corrective action consists of changing the transducer transmit frequency by adding one or more fm periods to the fx generation process. The framing resolution would not be adversely affected by this process. However, it would change the relationship of fx and fc and could affect data scatter.

4.1.1(b) Framing Optimization

Another way of avoiding aberrated regions is to check the phase coherence of all possible framing numbers in the otherwise acceptable region of the pulse train. This can be done by using the same "coherency" test method that may be used as a means of directly identifying TN, as described elsewhere, except used only in the selected window area. Here we are looking for a selection of a nominal framing number which has acceptable framing numbers on both sides of it. This assures that we are not close enough to an edge to change the count during reframing, or due to any flow rate itself. Naturally it is preferred that the coherency count obtained is exactly equal to the number of pulses in the pulse train. If this is not possible, it may be desired to call for the user to reduce the spacing between transducers by moving the fixed transducer to a lower value of "x" and trying to identify the nominal framing number again. Note that if it is not possible to eliminate all reverse counts it is necessary to value the pulse train as $N-2*A$, where N is the number of counts in the burst and A is the number of occluded or reverse count cycles.

In any event, once a satisfactory determination has been made in the "Up" direction, it must be repeated in the "Dn" direction. The final count enable window will include only sections that are acceptable in both the up and down transmission directions.

4.1.1.1 Supplementary Alternative TL Search

Note that it is possible to keep an easy check on the need to redo the search. It is clear that the Tbt time, which is checked "continuously", must be within at most T(Nx) time of the perceived Tn. If it falls outside of this relationship by a given magnitude a new TN search should be instituted. T(Nx) is the time for N pulses in the short pulse train to elapse. T(Nx) is equal to Tbt−TN, where Tbt is the time from the start of Tx, in the "short pulse train" cycle, to the arrival of a peak which generates a pulse Tb. This follows from the fact that a peak generating a Tb generally occurs time T(Nx) (the length of the short pulse train) after $T_X$ has elapsed, since there will be a summing of the respective pulses. See FIGS. 4K and 4L. For example. suppose N=3 pulses at 1 MHz so that the short pulse train is 3 microsec. long. Then generally a peak in Rx will occur about 3 microsec. after the beginning of the received Rx.

It is possible that this search mechanism will be repeated periodically as a means of determining if TN has changed, if this is not ultimately done by keeping track of the framing conducted during delta T determination. In any event, it should be done as a matter of course immediately after certain events, such as power shutdown, empty pipe, more than a designated number of successive reframings, say 2, or after a failed check of the Tbt location relative to the memorized TN location, or fault alarm etc.

4.1.2 Pulse Train Routine

Now that the TN location has been determined, the Phase Count window can be easily located. A simple rule such as starting the Phase (Demodulation) window say 5 fx cycles after Tba has proved to be sufficient to assure having entered the stable region of the receive pulse train in essentially all cases. Then the window can be set for a width of a somewhat shorter length (TBD) than the transmit pulse train itself.

The search defined above need only be conducted for the latter of the up or down receive signal arrival times. This is because the initial up and down windows should be "locked" together to assure that the same section of the pulse train is used for up and down delta t detection. This is done to minimize zero drift. Locking of the up and down windows is accomplished during Zero Flow setting. When Zero is set, the initial or "zero" up and down window positions are memorized as the framing number and the phase count residue difference between the up and down directions. This difference should be less than one transmit frequency period. And the absolute time of the window should be at least as late as the latest of the window locations determined during the search described just above. Thus, whenever this channel is activated, even after a power off condition, flow will be perceived as a difference in the framing number and phase count relative to this initial difference. This will be true even if TN, the arrival time of the signals for both up and down directions, changes radically due to changes in Vs, the liquid sonic velocity.

The basic means of flow related time difference data acquisition is as follows. A unit data set consists of two delta t measurements, the first a result of an up-dn transmission sequence, and the second the result of a dn-up sequence. Each transmission is made with a predetermined phase relationship between fx and fd, known as the "frame" number. This defines the relationship in units of master clock period, Tm (fm). When the pulse train Rx is received, its phase relationship to fd is measured after demodulation, and is converted to a count proportional to the difference in the relative phase from 90 degrees. The count is identified as "Phi".

Each delta t is obtained by effectively subtracting the dn Frame and Phi (phase) numbers from their corresponding up numbers. Since the Frame number difference represents a known number of "Tm" delay periods in Up vs. Dn transmission, and the Phi number represents the relative delay between the arrival of the receive signal "Rd" and the same demodulation clock phase, these numerical differences are directly interpretable as time differences between up and down ultrasonic signal travel times, or "Delta t" as noted below.

One frame number difference in up vs. down transmission directions is equal to a time delay of exactly one period, Tm, of the Master clock from which Tx is derived. This means that the number of frames available for a given transmit frequency is exactly equal to the Tx period divided by the Master clock period.

As noted above, if the relative phase of the received signal, Rx, and the demodulation signal, fd, is 90 degrees, the next Phi count is zero. A time difference between Rx and fd produces a net counting time of 4x dt for each pulse in the pulse train. Therefore, the equation defining the number of counts produced for a given dt is:

$$C = 4 * N * dt * fc$$

where,

N = number of pulses in the pulse train
dt = the time difference in the transmission time of the pulse train caused by flow. Note that this is the "one way" time difference, not the difference in up vs. down transmissions
fc = counter clock frequency As an example, if a pulse train has N=50, if fc=50 MHz, and if dt is 1 nanosecond, (as would be caused by a flow of 1 ft/sec in a 1 inch pipe), $$Count = 4 * 50 * (1 * 10^{-9}) * (50 * 10^6) = 10$$

Note that this count is independent of transducer frequency, and depends only on the number of pulses in the pulse train and the frequency of the phase counter. Naturally, larger pipes will produce a time difference sufficient to demand reframing, say 10 nanoseconds, or a count of 100 in the case above, at lower flow rates than needed in smaller pipes. Large pipes will need a large number of framing numbers to cover the entire flow range of 40 ft/sec. Conversely, in large pipes, it may be desired to reduce the number of pulses in the pulse train to limit the value of C produced by a given flow rate so as to prevent a command to reframe from being caused by very small flow rate changes.

Reframing is not always needed to prevent the counter from overflowing since the counter can hold milliseconds worth of counts. Reframing is needed merely to prevent the relative phase of fx vs. fd from approaching 0 or 180 degrees, which would cause demodulation anomalies.

It should be kept in mind that the only way that a flow rate change can cause a Fault is if the flow changes the count by the overflow amount from one which would produce an acceptable phase between Rx and fd at such a fast rate that reframing could not keep up with the change. The only other condition which could produce a stress on the reframing mechanism is a sudden change in liquid sonic velocity. But even such a change would have to occur at an extremely high and unlikely rate to defeat the reframing mechanism's attempt to keep the phase shift close to 90 degrees.

Tests have shown that the need for maintenance of the "optimum" 90 degrees is not essential since the digital demodulation count appears to be extremely linear even for extremely large deviations. This indicates that use of a low frequency fm to generate fx and fd is permitted even though this will mean that only coarse reframing will be available for the higher transmit frequencies. For example, if fm=12 mHz, and fx max=3 mHz, reframing will not be commanded until the phase displacement is about 30 degrees. This has given good performance If a particular transmission is lost due to a Fault, it is necessary for the system to either repeat the transmission, or to account for the lost transmission phase in computing delta t. In addition, it is desirable for the system to declare "Fault Alarm" if the liquid conditions do not permit the system to achieve stable framing in a defined period of time or number of attempts, say equivalent to one continuous second without receipt of any usable signal data. During this time, prior to declaration of Fault the system keeps repeating the last "good" data from Memory. The user should have an installation option of outputting A "zero" after declaration of Fault, or choosing a "Memory" mode, which will maintain the last good reading until the system comes out of fault.

Note that it is not necessary to read the Frame number "F" since this was known to the system prior to transmit. In any event the Frame and Phi values are put into memory for the up direction of that channel's assigned memory locations.

A test is then run to see if both pulse train transmissions for the current data set have been completed. If, as in this case, the answer is "no", the system loads all data needed to run a down pulse train, plus switching the T/R multiplexer from up to down. A second test determines if, as in this case, the transmission direction has been changed, which would invoke a time delay prior to commanding the next Tx so as to permit the transducers to "quiet." In either case, the next action is Txdn followed by an identical repeat of the routine described above, except for the return of frame and phi data to a "down" register for storage.

The above operations proceed until the "Set Complete" decision is "Yes". Now stored are two Frame and Phi numbers representing the two transmission pulse trains issued during the Pulse Train Routine (one up and one down transmission). It is possible to convert these two numbers into one number representing the time difference measurement. Or, it may be more convenient to save all these numbers, plus all the other like numbers obtained during subsequent pulse trains within one "Unit Data" cycle which lasts approximately 0.1 second. In this latter case a net average time difference would be computed just prior to advancing to the "Unit Data Computation" routine.

4.2 Unit Data Computation

Unit Data Computation refers to the process of converting the delta t data obtained for all channels in the prior 0.1 second, as signalled by a "tick" of the I/O clock during the Data Set Acquisition cycle, to actual flow velocity. Since the CPU "interleaves" all active channels, it is appropriate to update all channels at this time. (The only effect produced by multi-channel operation is to "thin out" the data by reducing the number of delta t measurements obtained for a given channel during the prior 0.1 second.)

Put simply, computation of Unit data consists of first determining vf, the flow profile compensated linear velocity in, say, ft/sec units. A smoothing algorithm may be invoked to produce Vf. Then Vf is used to compute Flow Total in such units as would have been selected during the installation process.

Finally, a test is run to see if the user selected time interval between Digital Display update has elapsed. If so, computation of the digital display in user selected units is commanded and followed by the actual output of data to the displays.

4.2.1 Compute Channel vf

As noted previously, delta t's have been measured for each active channel during the prior 0.1 second. This data has either been stored in a register as individual frame and phi numbers for all up and down transmissions, or as the signed average difference of all up vs. down numbers, or as the latter value converted to delta t in nanoseconds, as interpreted from the time relationships defined in the pulse train routine description above. If the last condition has not been achieved as yet this would be the first setup in vf computation. And in addition, this data may or may not have been subjected to smoothing.

The value of delta t thus obtained is applied to the computation of vf in the following formula:

$$dt = 2*(vf/Vs)*\sin(theta)*(d/Vs*\cos(theta))$$

but, $$TL = d/(Vs*\cos(theta))$$

and, $$\sin(theta)/Vs = \sin(rho)/Vps = \sin(alpha)Vc$$

so, $vf = Kc*Kr*Kd*(Vc/2*\sin(alpha))*dt/TL$ in (Velocity units)/sec where:
vf = Flow velocity in velocity units, ft/sec preferred
Kc = Intrinsic calibration constant, $0.85 = \leq Kc = \leq 1.15$
Kr = Flow profile compensation, a number between 0.75 and 1
Kd* = Transducer dispersion compensation, $1 = \leq Kd = \leq 1.1$
d = Pipe inside diameter
Vps = Shear mode velocity of actual pipe
Vpso = 126000 in/sec
rho = pipe wall beam angle
rho o = 50 degrees
Vc = Propogation velocity of transducer
Vco = 95000 in/sec
alpha = Transducer injection angle
alpha o = Asin((Vc o/Vps o)*sin(rho o))
dt = delta t = average time difference of prior 0.1 sec reports
TL = Liquid path sonic beam travel time from lookup table

*May be included in Kc, or located in table cells if variable.

Figure 10:
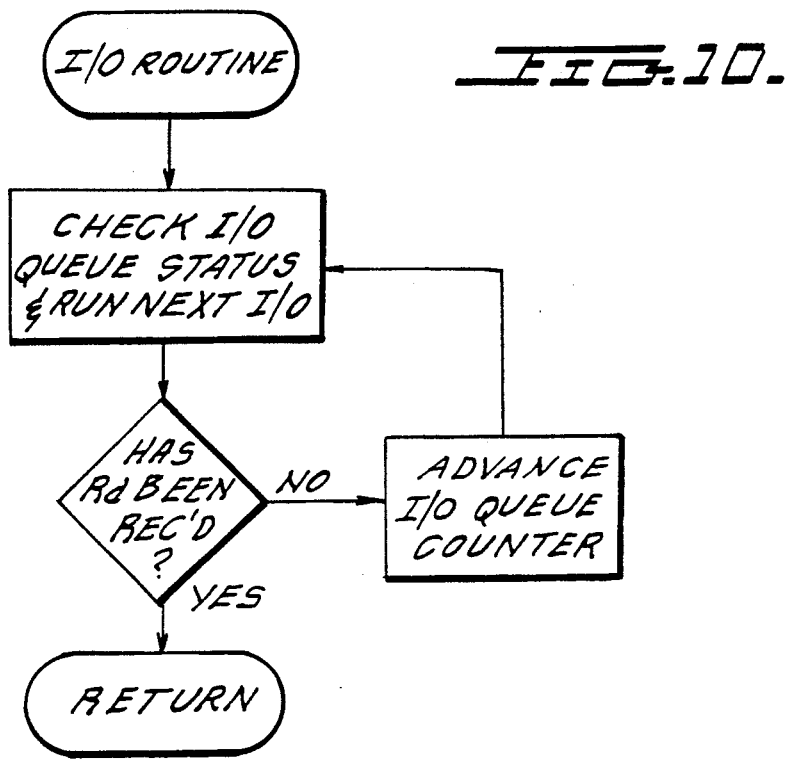

4.3 Data I/O Routine and I/O Routine Queue (FIGS. 10 and 11)

The process of data in preparation for its output is an ongoing process utilizing any waiting time available during the Data Set Acquisition, or other, activities. A logical sequence of such activities are listed in an I/O Queue, and are processed in this order. Depending on the resultant efficiency, it will be acceptable to complete the processing of a given I/O prior to returning to the Data Set Acquisition routine, or to return at the closest possible point to the setting of the Rd receive flag. The latter would require checking the status of this flag at such positions within an I/O processing routine as to allow immediate return to Data Acquisition. In this case, the I/O routine would pick up at the point of departure at the next return to I/O processing.

4.3.1 I/O Queue List

FIG. 12 shows the listing of the various I/O parameters. It is preferred to run only those routines which are called out at the time of installation so as to maximize the real time data density, unless a particular routine takes too little time to warrant the effort needed to specify it during installation.

It is expected that the sequence of I/O processing will be rigorous. However, certain I/O routines may require more frequent processing than others. If this is so, it is acceptable for these to be listed with greater frequency than the others.

5. Initial Makeup Routine Detail

The routine associated with the Initial Makeup, in the order executed, include the Tba Measurement Routine, and the TN Measurement Routine.

These routines are described in more detail below:

1) Tba Routine

Tba is determined in order to find TN. It is known that Tba must occur just after TN, but it is not readily predictable, since the transducers do not always produce a predictable waveshape. Nevertheless, Tba is the closest known place to start searching for TN.

Tba is found on the basis of the initial transducer installation spacing. The Tba "short pulse train" transmit frequency is the nominal Resonant fx of the user selected transducer size. Confirmation of the recommended transducer spacing starts the entire Initial Makeup process.

First the system installs the basic transmit pulse train parameters, including the PINHB defined for the recommended spacing. Then, the system generates a sufficient number "t" of short pulse trains at the designated frequency, fx. Using the Tb comparator and the early/late servo, the system determines a reliable value of Tba and N(Valc), the Valc register number. If a new frequency, fx, is tried later this process can be repeated.

2) TN Routine a) Immediately after determining Tba, the system changes the shape of PINHB into a short enable pulse or window called PENBL. PENBL lasts only 1.5 or 2.5 fd periods, for example.

b) Then the system moves PENBL earlier in time starting from $t_B$, to search for the beginning of Rx, which must be earlier than $t_B$. The ALC gain is raised 15 dB and the PENBL is moved to the earliest point where $t_B$ pulses are generated in response to $R_x$ This point is taken to be $t_N$.

2a) Alternate TN Routine

Another method may be available to derive an accurate TN figure.

Essentially, the alternate method also uses Tba (average Tb value) to locate a starting point for TN search. PENBL is initially positioned to end slightly after the measured Tba time. A sufficient number of short pulse train transmits are issued to determine and temporarily memorize the ALC count value at Tba time. N(Valc)o, which represents the gain needed to bring the peak Vsig during this window to the Tb reference level. However, as soon as PENBL is located, the system sets the gain at, say, 12 or 15 db below the N(Valc)o and looks for the time between TN min and Tba which develops Tb pulses at this gain setting. Presumably, this will occur at the same TN that was found in method (2).

This location is presumably close enough to the TN location, i.e., just after it, so that we can reduce the region to be searched and avoid the danger of accepting too early a TN The TN measurement steps in U.S. Pat. No. '548 could be used to limit the search, say to a region about 5 periods of the frequency fx.

The search would then be started at the 12 to 15 db down point, and then look earlier for either the lowest amplitude in that region, or for a point an additional 12 db down, whichever comes first.

C Frequency Optimization Routine

A longstanding problem is matching the available transducers to the given pipe in which flow is to be measured perfectly matched transducers will yield a cleaner output signal. Prior systems have required knowledge of data regarding the wall thickness and pipe material and in some systems this information, for many pipes, had to be stored in a custom ROM to be usable. There are many sizes of pipes and it is desirable to enable a minimum number of transducers to be kept on hand that will match all or most of the possible pipes. With the invention it has been found that a set of six transducers can be matched to all pipes of practical importance.

The features discussed up to this point include controlling the transmission frequency, and transmitting a pulse train, rather than a short burst of pulses or a single pulse. This combination of features enables the user to adapt the system to a set of standard transducers, thus avoiding any need for custom transducers.

The invention provides an initial autoadjusting routine, whereby a transducer is selected, and then a range of frequencies are tested to determine the optimum frequency for a given transducer, according to where the receive signal Rx has the best phase coherency with the clock signal $f_D$, that is, where the received signal is detected most accurately and the maximum amplitude of the received signal is obtained. If no signal is satisfactory, then the system will indicate that another transducer should be used.

The Initial Makeup routine tries a range of frequencies for a given transducer. The amplitude of Rx at a particular location is measured, namely N cycles after $t_N$, i.e., near the end of the measurement window. By this point, the signal Rx has reached a steady-state amplitude Thus its amplitude is a measure of how coherent the signal is. The phase coherence N cycles after $t_N$ is related to the amplitude at such point. Measurement anomalies are avoided by focusing on the cycles within the window, avoiding the edges of the window The appropriate range of frequencies for the given transducer are applied, and the frequency that gives the greatest such amplitude is selected. At such frequency, the best available signal injection for the particular transducer has been obtained.

A sweep-frequency generating system that is appropriate for use in generating ranges of frequencies for this purpose is disclosed in the above-mentioned U.S. Pat. No. 4,333,353, the disclosures of which are incorporated herein by reference.

A predetermined set of standard transducers can be used, for any pipe wall thickness, pipe material, and liquid. Given a particular liquid wall thickness, wall material and transducer, a frequency fx should be chosen so that pipe wall reflections arrive at the receiving transducer in phase with the corresponding incoming liquid wavefronts. Under practical conditions, the necessary fx for this purpose can vary even as widely as from about 12 MHz down to about 0.06 MHz as a function of all these parameters. These parameters also determine N, namely the point where steady state amplitude is reached. As mentioned above, the amplifier 44 has a wide band width, so it is able to handle this full range of frequencies for the practical range of pipe diameters encountered in practice.

1 Transducer Selection

Based on a given diameter and a given liquid (or its numerical parameters), for which the user is prompted by the system, the system selects a transducer (which may be overridden by the operator), mounting track type, and transducer spacing. For a universal pin-stop mounting track that is particularly suitable for use with this invention, see my copending U.S. patent application Ser. No. 07/365,364, filed Jun. 13, 1989, titled "Mounting Structure for Transducers," now U.S. Pat. No. 5,001,936, the disclosures of which are incorporated by reference.

Selection of the transducers for use in this system does not depend on either the pipe material or wall thickness. Their selection depends only on the pipe diameter. Only six sizes of transducers are needed to cover the entire range of pipe diameters ordinarily encountered:

Size 1: 0.5–4 Inches OD
Size 2: 1.25–8
Size 3: 6–24 (reduced sonic velocity above 20")
Size 4: 20–48 (reduced sonic velocity above 42")
Size 5: 36–84
Size 6: 72–200

The initial transducer selection is made by first calculating the preferred frequencies, and then based on the actual pipe diameter, and the need for a frequency low enough in view of flow velocity considerations, the most appropriate transducer size is then chosen.

2 Frequency Selection

After selection of transducers, the optimum frequency for use with that transducer is determined.

Table I illustrates the range of frequencies tested by the system during the initial make-up.

As shown, it has been found particularly advantageous to use a master clock frequency Tm of 41.6666 MHz, and a clock frequency Tc of 27.08 MHz, to give a ratio of Tc/Tm of 0.650024. The use of these two frequencies has been found to give an extremely small data scatter of the demodulated pulse data, giving great precision in the flow measurements. Measures are taken to provide complete isolation between the master clock which generates Tm and the count clock which generates Tc. The two clocks are on separate boards and have separate frequency generating equipment with no synchronization means whatsoever.

The master clock frequency Tm (41.6666 MHz) is transformed to several nominal frequency ranges as follows:

fx1: 3.0 MHz
fx2: 1.5 MHz
fx3: 0.75 MHz
fx4: 0.375 MHz
fx5: 0.2 MHz
fx6: 0.1 MHz

Each of the columns in Table I corresponds to a particular transducer size and shows the frequencies that are tested for that size. The system determines the optimum frequency for any pipe, based on six standardized sets of transducer parameters corresponding to the six transducers.

The frequencies listed in each column below the main frequency are additional frequencies that are tested in that particular range. The right-hand column shows the percentage change from the main frequency For example, referring to the column designated "fx1" after 3 MHz is tested, 2.4 MHz is then tested, which is a 20 percent change from 3 MHz. Then, 2 MHz is tested, which is a 33.33 percent change from the main frequency.

Some of the frequencies in the respective columns above need not actually be tested, since it is not necessary to vary the six nominal main frequencies by the large percentages shown in Table I.

Transducers can be employed above their nominal frequency as well as below, and considering the resolution that is obtainable by the framing process disclosed hereinabove, it is not desirable to use a transducer at a frequency more than, for example, 40 percent from its nominal frequency. Advantageously, the set of six transducers will have their nominal frequencies incremented substantially in octaves, thus providing a range of transducers whereby all needed frequencies can be provided for, as long as they can be synthesized.

In general, it is found to be better to raise a transducer's frequency above its nominal frequency, rather than reduce it. This is because lower frequency transducers have a larger aperture and would be less likely to generate a low ratio of signal to pipe noise, due to beam spread. However, this consideration is weighed against the larger size of the lower frequency transducers.

Table II shows an example of an actual measurement procedure. As shown therein, each nominal frequency is varied both upward and downward For example, for testing the transducer designated size 2, with nominal frequency 1.5 MHz, as shown in the right-hand column, this frequency is taken as a central frequency for a range, and then the nominal frequency is varied both upward and downward, up to 2 MHz, i.e., an upward change of 33.3 percent, and down to 1.090909 MHz, a downward change of 27.3 percent. The right column also indicates a calculated nominal break point of 2.12132 MHz between the frequency ranges corresponding to the size 1 transducer and the size 2 transducer.

3 Initial Makeup Routine

The Initial Makeup Routine includes, in addition to routines discussed previously:
   fx Optimization—Amplitude Quality Measurement Routine
   n Optimization—Window Framing Margin Measurement Routine The Initial Makeup Routine is invoked when the transducers are first installed, or whenever they are moved.

Initial Makeup is the routine which controls the transmission characteristics of the system to insure that they are appropriate for the actual pipe conditions, so as to achieve the best possible data. The process starts with parameters derived from the characteristics of the site setup, and adds information that the system obtains itself from the actual pipe and liquid. The user can also impose his knowledge of the actual liquid sonic velocity, so as to achieve the best possible accuracy.

a) The user identifies the following Site parameters:
Pipe OD
Pipe Wall Thickness
Pipe Material
Type of Liquid and/or Estimated Liquid Sonic Velocity.

b) The system advises the user of which of the six transducer sizes is/are preferred, and the preferred type of mounting track(s) and transducer location. The system recommends the transducer location in accordance with installed pipe diameter, wall thickness, material and transducer size rules. The user can also select another transducer type or location if feasible.

The system then runs the Tba and Tn routines.

The system, in coordination with user information, advises itself of:
   What transmit frequency(s), (fx) are allowable How long a PINHB period is required
How long a Transmission Burst period is allowed (TB)
What minimum Transmission delay period is needed The system then determines the following, using appropriate criteria:

Which of the allowable transmit frequencies to use
Which gives the best Vsig amplitude
What is the number of transmit pulses, N, to use
What is the length, n, of the acceptable Demod Window (Including both pre-reference and post-reference sections)
Is the Demod Window length acceptable
How many fd periods after TN, "x", does "n" start
What are the Initial Framing and Phase numbers

4. fx Optimization—Amplitude Quality Measurement Routine

Amplitude Quality refers to two properties of Vsig: the Absolute Amplitude, affecting the signal-to-noise ratio in the region which contains the demodulation window, and the Shape of the Vsig amplitude in the region of the window, which has a bearing on the required phase coherence within the window. There is no absolute measure of Amplitude Quality, but a rational and effective measure has been created which can be consistently implemented by the system.

First, it is recognized that Vsig Shape can only be used to estimate which one or another of the alternate frequencies is more likely to have phase coherence, so that the "better" one is tried first. In other words, "Shape" does not preclude need for an actual phase coherence test, which can and will be run in any case.

Absolute amplitude, however, is also employed as a rating factor.

4.1) Absolute Amplitude Measurement

The basic data for Absolute Amplitude measure is taken in the same basic way that TN was determined, except that a full "N" cycle transmit is used. A "PENBL" 1 or 2 fd periods long, is positioned at the place where the longest demodulation window should end, which is N fd periods after TN. The system stays at that position until N(Valc) is stabilized and has been temporarily memorized. The best choice among the available frequencies, fx, is the one which has the largest amplitude at that position, i.e., the one with the highest N(Valc). This will in general also produce the best phase coherence.

However, it must be recognized that a transducer is not absolutely flat in frequency response. In general, there is anywhere from a 3 to 10 dB amplitude drop from its center frequency to the "edge" frequency. It is important that the system correct for this deviation before deciding on the "best" fx. It is preferable that a simple formula be used for this correction, such as:

$$dA = A(dfxn/dfx\ max)$$

where, dA = amount of added gain to assign to the measured amplitude at a frequency, fxn
A = a predetermined number of dB, dependent on transducer size
$dfxn = ABS\ (fxn - fxo)$ where, fxo = transducer center frequency and, $dfx\ max = ABS\ (fxn\ max - fxo)$

4.2) Vsiq Shape Measurement

Now, the figure of merit for Shape can be defined as a measure of the "flatness" of Vsig. This can be determined by measuring the Vsig amplitude changes across the period of Vsig. For example, the system measures N(Valc) for 1.0/fx periods, starting at the point N fx periods after TN, and "sweeping" towards TN, and looks for a point whose N(Valc) value is, say, 3 to 6 dB different than the prior measurement. Thus the maximum demodulation window can be defined as being the width which is one period short of including the "sudden" different amplitude point. In other words, what should be excluded is the point of any sudden different amplitude.

The same type of test should be run for the portion of Vsig which arrives after the reference point, N fd periods after TN. However, it should be understood that this region is created by the "ringdown" portion of the transducer, and may be inherently less stable than the earlier section. However, it would still be useful to use the contiguous half of the number of acceptably phase coherent cycles following the reference point in all cases. This is especially important in Reflect mode, where the number of transmit pulses is usually smaller than in Direct mode.

In addition, it is believed desirable to include a second amplitude test, to insure that the selected window does not include any Vsig whose amplitude is more than, say, 6 to 10 dB above or below the amplitude at the reference location, "N" fx periods after TN.

As noted above, these tests are run only on the Vsig created by the frequency selected by the absolute amplitude test from among the allowable frequencies for the selected transducer.

4.3) n Optimization-Window Framing Margin Measurement Routine

As noted above, the Vsig Shape figure of merit does not preclude need to test and optimize phase coherence, and to reject an fx if the resultant Vsig does not meet minimum acceptance criteria for phase coherence. Note that it may be sufficient to optimize the framing in only one direction, either up or down, and then simply lock the other window within the Vf max criteria.

It is clear, from experiments and computer studies, that a long transmit burst is more reliable for developing a phase coherent Vsig, especially in the region near N pulse periods after TN. The optimum framing for any Vsig is the one which has the greatest margin against phase inversion, in either direction of reframing.

The best fx is the one which produces the longest demodulation window of acceptable phase margin of any possible fx for that transducer. For lower frequencies, the minimum acceptable framing margin is 2 framing numbers on each side of nominal, with at least a margin of 3 preferred, for all frequencies which can support such a margin. For 2.4 and 3 megahertz, and possibly for other frequencies down to about 1.7 megahertz, the margin cannot practically be greater than 1.

The window Size, n, optimization test includes the following steps:

a) The basic Framing Margin test uses a full transmit burst, N. The system first finds the nominal framing for a window which starts at the earliest location found acceptable in the Vsig shape tests, and extends to N fd periods after TN. It then tests for phase aberration for 2 framing number deviation on each side of nominal framing, except for impossible frequencies. A successful test is one in which the expected count number "n" is obtained by counting the phase of fxd with the edges of fd. If this test is passed, the present window size is accepted.

b) If the system has failed to get a margin of 2, where possible, the system then reduces the size of the window by 1 fd period, leaving the end of the window N periods after TN. It then repeats a) above, always reframing before testing the phase margin, until either the acceptance criteria of a margin of 2 framing numbers has been met, or until a minimum acceptable window width "z" has been reached.

c) If "z" has been reached, the window width is chosen as the largest "n" which gave a margin of 1 framing number, unless the width can be increased by the method described below in d).

d) It is always important to maximize the size of the window. In some cases the width can exceed N fd cycles, if the transducer after-ringing is coherent. This can be done by attempting to use the region following N fd periods after TN. To do this, in such a case, the system now tries to increase the window width by including the region following the reference point which has passed the Amplitude Shape test. The system uses the method described in a), always optimizing framing before the margin test. The system will choose the largest number of additional pulses which do not reduce the margin to below 2 framing numbers, except for 2.4 and 3 MHz, where the margin should be smaller, as mentioned above.

e) If "z" has been reached without ever getting a phase margin of at least 1 framing number, the current fx is not acceptable.

f) If no allowable fx is acceptable the system signals the user to try either another mounting location, or another size transducer.

Although the invention has been described in connection with specific embodiments thereof, the appended claims are not limited to the disclosed embodiments, but rather are to be construed as embodying all modifications, improvements and alternative constructions, that may occur to one of ordinary skill in the art, which fairly fall within the inventive teachings set forth herein.

What is claimed is:

1. A method of measuring the rate of flow of a fluid within an enclosed axially elongated hollow conduit, comprising the steps of:
    securing first and second transducers to the exterior surface of said conduit such that said first and second transducers are spaced from each other along the axis of said conduit, said first transducer being located downstream from said second transducer with respect to the direction of flow of said fluid;
    transmitting a train of ultrasonic pulses in an upstream direction from said first transducer to said second transducer and transmitting a train of ultrasonic pulses in a downstream direction from said second transducer to said first transducer;
    determining the total transit time in liquid between the transducers $t_L$; and
    measuring the rate of flow of said fluid by determining the difference between the respective amounts of time said ultrasonic pulses taken to travel in said upstream and said downstream directions;
    wherein said step of determining said time difference includes the step of measuring phase differences between, on the one hand, said upstream ultrasonic signal train received by said second transducer, and said downstream ultrasonic signal train received by said first transducer; and on the other hand, a phase reference signal which is phase coherent with said transmitted ultrasonic signals; and
    wherein said flow rate is computed in accordance with the following equation:

$$V_f = (K \text{ delta } T)/t_L$$

wherein $V_f$ is a signal indicating the rate of flow of said fluid through said conduit, K is a proportionality constant, delta T is the difference in the upstream and downstream transmission times and $t_L$ is the overall time required for the ultrasonic signal to pass through the fluid during a single transmission between said first and second transducers.

2. A method as in claim 1, further comprising the step of selecting a transmit frequency fx for the ultrasonic pulses to be transmitted.

3. A method as in claim 2, further comprising the step of transmitting a short pulse train between said transducers and determining the total elapsed time $t_N$ the short pulse train takes to travel between the transducers.

4. A method as in claim 3, wherein the step of determining the total time in liquid $t_L$ is carried out by subtracting a known conduit transmit time from $t_N$.

5. A method as in claim 3, wherein said short pulse train comprises 3 cycles of said frequency fx.

6. A method as in claim 1, further comprising the steps of:
    selecting a transmit frequency fx for the ultrasonic pulses to be transmitted; and
    transmitting a train of N ultrasonic pulses Tx at said frequency fx.

7. A method as in claim 6, wherein N is between 8 to 100 inclusive.

8. A method as in claim 6, further comprising the step of receiving a received pulse train Rx and digitizing a steady-state portion thereof to generate a signal Rd.

9. A method as in claim 8, further comprising the step of determining a phase difference between said signal Rd and a phase reference signal fd whose frequency is fx; and
    processing said phase difference to determine said time difference between said upstream and downstream travel times.

10. A method of measuring the rate of flow of a fluid within an enclosed axially elongated hollow conduit, comprising the steps of:
    securing first and second transducers to the exterior surface of said conduit such that said first and second transducers are spaced from each other along the axis of said conduit, said first transducer being located downstream from said second transducer with respect to the direction of flow of said fluid;
    transmitting a train of ultrasonic pulses in an upstream direction from said first transducer to said second transducer and transmitting a train of ultrasonic pulses in a downstream direction from said second transducer to said first transducer; and
    measuring the rate of flow of said fluid by determining the difference between the respective amounts of time said ultrasonic pulses take to travel in said upstream and said downstream directions;

wherein said step of determining said time difference includes the step of measuring phase differences between, on the one hand, said upstream ultrasonic signal train received by said second transducer, and said downstream ultrasonic signal train received by said first transducer, and on the other hand, a phase reference signal which is phase coherent with said transmitted ultrasonic signals; and further comprising the steps of:

transmitting a series of variable-frequency test pulse trains; and determining which transmitted frequency results in the greatest amplitude test signal received by the receiving transducer.

11. A method as in claim 10, wherein said test pulse trains are transmitted prior to measuring the rate of flow of said fluid.

12. A method as in claim 10, further comprising the steps of:

grouping the variable frequencies of said test pulse trains into ranges;

associating each of said ranges with a respective pair of transducers; and transmitting the test pulse trains with the range of frequencies which corresponds to said first and second transducers.

13. A method as in claim 12, wherein said frequencies are grouped into six ranges which are associated with six pairs of transducers.

14. A method as in claim 12, wherein a sweep frequency generator is used to generate said ranges of said variable-frequency pulse trains.

15. A method as in claim 12, wherein said ranges are derived from a master clock frequency 16. A method as in claim 15, wherein said phase relationship of said phase reference signal and said received signal is determined by counting clock pulses which are derived from a count clock frequency; and said master and count clock frequencies have a non-harmonic and non-pseudo-harmonic relationship.

17. A method as in claim 16, wherein the ratio of said count clock frequency to said master clock frequency is substantially about 0.65.

18. A method as in claim 17, wherein said ratio is substantially 0.650024.

19. A method as in claim 18, wherein said master clock frequency is substantially 41.6666 MHz and said count clock frequency is substantially 27.08 MHz.

20. A method as in claim 16, further comprising the step of electronically isolating the sources of the master and count clock frequencies from each other so as to prevent any synchronization thereof.

21. A method as in claim 10, further comprising the step of waiting until the received signal reaches a steady state before determining its amplitude.

22. An ultrasonic flow meter for measuring the rate of flow of a fluid within an enclosed axially elongated hollow conduit, comprising:

first and second transducers securable to the exterior surface of said conduit, means for securing said first and second transducers spaced from each other along the axis of said conduit such that said first transducer is located downstream from said second transducer with respect to the direction of flow of said fluid; said transducers being capable of transmitting to each other, and receiving from each other, ultrasonic signals which pass through said fluid in said conduit;

ultrasonic signal generation means for causing said first transducer to transmit a train of ultrasonic pulses in an upstream direction from said first to said second transducer and for causing said second transducer to transmit a train of ultrasonic pulses in a downstream direction from said second to said first transducer;

means for determining the total transit time of said pulses in liquid between the transducers $t_L$; and flow measurement circuit means for measuring the rate of flow of said fluid as a function of the difference between the respective amounts of time said upstream and said downstream ultrasonic pulses take to travel between said transducers, and an overall time required for the ultrasonic signal to pass through the fluid during a single transmission between said first and second transducers;

wherein said flow measurement circuit means determines said time difference by measuring phase differences between, on the one hand, said upstream ultrasonic pulse train received by said second transducer, and said downstream ultrasonic pulse train received by said first transducer; and on the other hand, a reference signal which is phase coherent with said transmitted ultrasonic signals; and wherein said flow measurement circuit means computes said flow rate in accordance with the following equation:

$$V_f = (K \text{ delta } T)/t_L$$

wherein $V_f$ is a signal indicating the rate of flow of said fluid through said conduit, K is a proportionality constant. delta T is the difference between the upstream and downstream transmission times and $t_L$ is the overall time required for the ultrasonic signal to pass through the fluid during a single transmission between said first and second transducers.

23. A flow meter as in claim 22, wherein said flow measurement circuit means comprises detector means which receives signals Rx which are generated by said transducers in response to ultrasonic pulses received through said fluid; for digitizing a steady-state portion of said signal Rx to generate a digitized signal Rd.

24. A flow meter as in claim 22, wherein said flow measurement circuit means comprises a zero-crossover detector which receives signals Rx which are generated by said transducers in response to ultrasonic pulses received through said fluid, and which outputs a first digital value when Rx is substantially above zero and a second digital value when Rx is substantially below zero, to generate a digitized signal Rd.

25. A flow meter as in claim 24, further comprising means for supplying a digital demodulator clock signal fd whose frequency is fx and which is controlled to be remain approximately in quadrature with Rd; and XOR means for generating an up/down control signal which has a predetermined digital value when signals Rd and fd have a common digital value.

26. A flow meter as in claim 25, further comprising an up/down counter which receives said up/down control signal and also receives count clock pulses fc; and wherein said up/down counter counts up said count clock pulses when said up/down control signal has one of said digital values, and counts down when said up/down control signal has the other of said digital values;

whereby, the total count of said up/down counter reflects the phase relationship of said signals Rd and fd.

27. A flow meter as in claim 26, further comprising separated means for generating said count clock pulses fc and said transmit frequency fx and for preventing synchronization thereof, said transmit and count clock frequencies having a non-harmonic and non-pseudo-harmonic relationship.

28. A flow meter as in claim 27, wherein the ratio of said count clock frequency to said transmit frequency is substantially about 0.65.

29. A method as in claim 28, wherein said ratio is substantially 0.650024.

30. A method as in claim 29, wherein said master clock frequency is substantially 41.6666 MHz and said count clock frequency is substantially 27.08 MHz.

31. A flow meter as in claim 27, wherein said separated means comprise respective circuits which are substantially isolated from one another.

32. An ultrasonic flow meter for measuring the rate of flow of a fluid within an enclosed axially elongated hollow conduit, comprising:

first and second transducers securable to the exterior surface of said conduit; means for securing said first and second transducers spaced from each other along the axis of said conduit such that said first transducer is located downstream from said second transducer with respect to the direction of flow of said fluid; said transducers being capable of transmitting to each other, and receiving from each other, ultrasonic signals which pass through said fluid in said conduit;

ultrasonic signal generation means for causing said first transducer to transmit a train of ultrasonic pulses in an upstream direction from said first to said second transdsucer and for causing said second transducer to transmit a train of ultrasonic pulses in a downstream direction from said second to said first transducer; and flow measurement circuit means for measuring the rate of flow of said fluid as a function of the difference between the respective amounts of time said upstream and said downstream ultrasonic pulses take to travel between said transducers;

wherein said flow measurement circuit means determines said time difference by measuring phase differences between, on the one hand, said upstream ultrasonic pulse train received by said second transducer, and said downstream ultrasonic pulse train received by said first transducer; and on the other hand, a reference signal which is phase coherent with said transmitted ultrasonic signals; and wherein said signal generation means transmits a series of frequency test pulse trains having variable frequency, and said flow measurement circuit means determines which transmitted frequency results in the greatest amplitude signal received by the receiving transducer.

* * * * *